(12) United States Patent
Yan et al.

(10) Patent No.: US 11,772,647 B2
(45) Date of Patent: Oct. 3, 2023

(54) CONTROL SYSTEM FOR A VEHICLE

(71) Applicant: JAGUAR LAND ROVER LIMITED, Coventry (GB)

(72) Inventors: Hongshi Yan, Warwickshire (GB); Andrew Fairgrieve, Warwickshire (GB); Paul King, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 285 days.

(21) Appl. No.: 16/305,748

(22) PCT Filed: Jun. 22, 2017

(86) PCT No.: PCT/EP2017/065337
§ 371 (c)(1),
(2) Date: Nov. 29, 2018

(87) PCT Pub. No.: WO2017/220705
PCT Pub. Date: Dec. 28, 2017

(65) Prior Publication Data
US 2020/0317194 A1  Oct. 8, 2020

(30) Foreign Application Priority Data

Jun. 24, 2016 (GB) ................................. 1611027
Aug. 8, 2016 (GB) ................................. 1613582

(51) Int. Cl.
*G05D 1/00* (2006.01)
*B60W 30/12* (2020.01)
(Continued)

(52) U.S. Cl.
CPC ............ *B60W 30/12* (2013.01); *B60W 10/20* (2013.01); *B60W 30/143* (2013.01);
(Continued)

(58) Field of Classification Search
CPC combination set(s) only.
See application file for complete search history.

(56) References Cited

U.S. PATENT DOCUMENTS 9,555,803 B2 * 1/2017 Pawlicki ................ G01S 11/12
9,836,051 B2 * 12/2017 Ishikawa ............... B60W 30/12
(Continued)

FOREIGN PATENT DOCUMENTS

DE   102012004198 A1   10/2012
DE   102012112164 A1    6/2014
(Continued)

OTHER PUBLICATIONS

Search and Examination Report, GB1611027.2, dated Dec. 21, 2016, 6 pp.
(Continued)

*Primary Examiner* — Hunter B Lonsberry
*Assistant Examiner* — Matthew J. Reda
(74) *Attorney, Agent, or Firm* — McCoy Russell LLP

(57) ABSTRACT

A control system (10, 19, 185C) for a vehicle (100), the system comprising a processing means (10, 19) arranged to receive, from terrain data capture means (185C) arranged to capture data in respect of terrain ahead of the vehicle by means of one or more sensors, terrain information indicative of the topography of an area extending ahead of the vehicle (100), wherein the terrain information comprises data defining at least one 2D image of the terrain ahead of the vehicle, wherein the processing means (10, 19) is configured to: perform a segmentation operation on image data defining one said at least one 2D image and identify in the image data edges of a predicted path of the vehicle; calculate a 3D point cloud dataset in respect of the terrain ahead of the vehicle based on the terrain information; determine the 3D coordinates of lateral edges of the predicted path of the vehicle by (Continued)

reference to the point cloud dataset, based on the coordinates of edges of the predicted path identified in the 2D image, to determine a 3D predicted path of the vehicle; and control the direction of travel of the vehicle in dependence at least in part on the 3D predicted path.

20 Claims, 9 Drawing Sheets

(51) Int. Cl.
| | |
|---|---|
| *B60W 10/20* | (2006.01) |
| *B60W 30/14* | (2006.01) |
| *B60W 40/072* | (2012.01) |
| *B60W 10/06* | (2006.01) |
| *B60W 10/10* | (2012.01) |
| *B60W 10/18* | (2012.01) |
| *B60W 30/02* | (2012.01) |

(52) U.S. Cl.
CPC .......... *B60W 40/072* (2013.01); *B60W 10/06* (2013.01); *B60W 10/10* (2013.01); *B60W 10/18* (2013.01); *B60W 30/02* (2013.01); *B60W 2420/42* (2013.01); *B60W 2552/35* (2020.02); *B60W 2552/53* (2020.02); *B60W 2554/801* (2020.02); *B60W 2720/10* (2013.01)

(56) References Cited

U.S. PATENT DOCUMENTS

| | | | | |
|---|---|---|---|---|
| 9,884,623 | B2* | 2/2018 | Fasola | B60W 30/12 |
| 2005/0015201 | A1* | 1/2005 | Fields | G08G 1/163 |
| | | | | 340/436 |
| 2005/0196019 | A1* | 9/2005 | Taniguchi | G06V 20/588 |
| | | | | 382/104 |
| 2007/0032904 | A1* | 2/2007 | Kawagoe | G05D 1/0227 |
| | | | | 701/23 |
| 2010/0097456 | A1* | 4/2010 | Zhang | G06K 9/00798 |
| | | | | 348/119 |
| 2010/0209013 | A1 | 8/2010 | Minear et al. | |
| 2014/0118716 | A1 | 5/2014 | Kaganovich | |
| 2014/0336844 | A1* | 11/2014 | Schwindt | B60K 31/0008 |
| | | | | 701/1 |
| 2015/0158526 | A1* | 6/2015 | You | B62D 15/025 |
| | | | | 701/42 |
| 2016/0018229 | A1* | 1/2016 | Lee | G01C 21/34 |
| | | | | 701/409 |
| 2016/0104289 | A1* | 4/2016 | Chang | G05D 1/0274 |
| | | | | 382/154 |
| 2017/0039855 | A1* | 2/2017 | Maeda | B60W 30/09 |
| 2017/0088134 | A1* | 3/2017 | Liu | G08G 1/165 |
| 2017/0336796 | A1* | 11/2017 | Jun | G05D 1/027 |

FOREIGN PATENT DOCUMENTS

| | | | | |
|---|---|---|---|---|
| EP | 2273334 | A1 | 1/2011 | |
| WO | WO-2014189059 | A1 * | 11/2014 | B60W 40/064 |
| WO | 2015106799 | | 7/2015 | |

OTHER PUBLICATIONS

International Search Report and Written Opinion, PCT/EP2017/065337, dated Oct. 11, 2017, 14 pp.
Hendrik Dahlkamp et al.: Self-supervised Monocular Road Detection in Desert Terrain, Proceedings of the Robotics Science and Systems Conference, Jan. 1, 2006.
Thrun S., et al., "Stanley: The Robot that Won the DARPA Grand Challenge," Journal of Field Robotics 23(9), Sep. 1, 2006, pp. 661-692.
Rankin et al., "Stereo vision based terrain mapping for off-road autonomous navigation," SPIE, Dec. 31, 2009, pp. 4-9.
Ralph Aeschimann et al., "Ground or obstacles? Detecting clear paths in vehicle navigation," IEEE International Conference on Robotics and Automation, May 1, 2015, pp. 3927-3934.
Dahlkamp, H. et al., "Self-supervised Monocular Road Detection in Desert Terrain," Proceedings of the Robotics: Science and Systems II, Aug. 16, 2006, Philadelphia, Pennsylvania, 7 pages.
Thrun, S. et al., "Stanley: The Robot that Won the DARPA Grand Challenge," Journal of Field Robotics, vol. 23, No. 9, Sep. 25, 2006, 32 pages.
Rankin, A. et al., "Stereo-vision-based terrain mapping for off-road autonomous navigation," Proceedings of SPIE—The International Society for Optical Engineering, Dec. 31, 2009, Available as Early as May 2009, Bellingham, Washington, 17 pages.
Aeschimann, R., "Ground or Obstacles? Detecting Clear Paths in Vehicle Navigation," Proceedings of the 2015 IEEE International Conference on Robotics and Automation (ICRA), May 26, 2015, Available as Early as May 1, 2015, Seattle, Washington, 8 pages.
ISA European Patent Office, International Search Report and Written Opinion Issued in Application No. PCT/EP2017/065337, dated Oct. 11, 2017, WIPO, 11 pages.

\* cited by examiner

| S3 $L_3$ | S4 $L_4$ | S5 $L_5$ |
|---|---|---|
| S2 $L_2$ | S $L_C$ | S6 $L_6$ |
| S1 $L_1$ | S8 $L_8$ | S7 $L_7$ |

$$p_i = \begin{bmatrix} w_1 * L_C \\ w_2 * a_C \\ w_2 * b_C \\ w_3 * (L_1 - L_C) \\ w_3 * (L_2 - L_C) \\ \vdots \\ w_3 * (L_8 - L_C) \end{bmatrix}$$

FIGURE 5

CONTROL SYSTEM FOR A VEHICLE

CROSS-REFERENCE TO RELATED APPLICATIONS

This application is a 371 of International Application No. PCT/EP2017/065337, filed Jun. 22, 2017, which claims priority to GB Patent Application No. 1611027.2, filed Jun. 24, 2016, and GB Patent Application No. 1613582.4, filed Aug. 8, 2016, the contents of which are incorporated by reference herein in their entirety.

INCORPORATION BY REFERENCE

The content of co-pending UK patent applications GB2507622 and GB2499461 are hereby incorporated by reference. The content of U.S. Pat. No. 7,349,776 and co-pending international patent applications WO2013124321 and WO2014/139875 are incorporated herein by reference. The content of UK patent applications GB2492748, GB2492655 and GB2499279 and UK patent GB2508464 are also incorporated herein by reference.

FIELD OF THE INVENTION

An aspect of the invention relates to a system for controlling the speed of a vehicle. In particular, but not exclusively, the invention relates to a system for controlling the speed of a land-based vehicle which is capable of driving in a variety of different and extreme terrains and conditions.

Another aspect of the invention relates to a system for controlling a vehicle. In particular, but not exclusively, the invention relates to a system for controlling steering of a land-based vehicle which is capable of driving in a variety of different and extreme terrains and conditions.

BACKGROUND

In known vehicle speed control systems, typically referred to as cruise control systems, the vehicle speed is maintained on-road once set by the user without further intervention by the user so as to improve the driving experience for the user by reducing workload. Cruise control speed (or cruise set-speed) is settable by the vehicle driver, typically by pressing a button when the vehicle is at the desired speed. Plus and minus buttons provide for incremental speed variation whilst the cruise control is set.

Once the user has selected a speed at which the vehicle is to be maintained, the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or a clutch pedal is depressed, the cruise control system is disabled so that the user can override the cruise control system to change the vehicle speed without resistance from the system. When the cruise control system is active, if the user depresses the accelerator pedal a sufficient amount the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

Some vehicles are adapted for off-highway use, and low-speed cruise control systems for such vehicles have been developed. In off-highway conditions low-speed cruise control systems permit a driver, particularly a novice driver, to concentrate upon activities such as steering.

Low-speed cruise (or 'low-speed speed') control systems suitable for off-road use may be configured to cause a vehicle to travel at a speed that is below the user-determined set-speed in dependence on the prevailing terrain over which the vehicle is travelling. Nevertheless the present applicant has recognised that there are circumstances other than driving over prevailing terrain in which a reduced vehicle speed would be helpful to a user endeavouring to negotiate the terrain.

In particular, the present applicant has recognised that it would be of value if a low-speed speed control system were able to adjust vehicle speed in dependence on the curvature of the path of the vehicle ahead of the vehicle. Steering inputs may be used to predict vehicle path trajectory at relatively close range, however in order to reduce speed for a sharp turn it may be advantageous to identify an upcoming curve prior to the steering wheel being turned. Path detection and prediction in off-road environments is non-trivial due at least in part to the variety of terrain and conditions in which a vehicle may operate when off-road. The absence of features such as lane markers, curbs and the like poses a not insignificant challenge. The boundary between vehicle path and surrounding terrain may be ill defined at least in part due to terrain features such as vegetation, changes of path material or path geometry along the path, and the presence of standing or flowing water or shadows.

Furthermore, in particular where there are other features of the terrain that it may be advantageous to control the speed to account for, for example tight gaps, it would be advantageous to have reliable path prediction.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

GB2492655B discloses a control system for a motor vehicle in which the most appropriate terrain mode for the prevailing terrain over which the vehicle is driving is determined automatically by the control system. The control system then causes the vehicle to operate in the terrain mode determined to be the most appropriate.

In known vehicle steering control systems, such as lane keeping systems, a forward-looking camera system detects lane markings on the road ahead of the vehicle. In some systems feedback in the form of an audible alarm or haptic response, such as vibration of a steering wheel, is provided in the case that the vehicle deviates excessively from a notional lane centreline or crosses a lane marking. Some steering control systems automatically control steerable road wheel steering angle in order to maintain a vehicle in-lane when driving on a highway by reference to lane markings.

The present applicant has recognised that known steering control systems are unusable in off-road driving environments where such systems may be of particular value in reducing driver fatigue.

It is against this background that the present invention has been conceived. Embodiments of the invention may provide an apparatus, a method or a vehicle which addresses this problem. Other aims and advantages of the invention will become apparent from the following description, claims and drawings.

SUMMARY OF THE INVENTION

In one aspect of the invention for which protection is sought there is provided a system for a vehicle, the system comprising a processing means arranged to receive, from terrain data capture means arranged to capture data in respect of terrain ahead of the vehicle by means of one or more sensors, terrain information indicative of the topography of an area extending ahead of the vehicle, wherein the terrain information comprises data defining at least one 2D image of the terrain ahead of the vehicle, wherein the processing means is configured to:
perform a segmentation operation on image data defining one said at least one 2D image and identify in the image data edges and/or a centreline of a predicted path of the vehicle;
calculate 3D data in respect of the terrain ahead of the vehicle based on the terrain information;
determine the 3D coordinates of edges and/or the centreline of the predicted path of the vehicle by reference to the 3D data, based on the coordinates of edges and/or the centreline of the predicted path identified in the 2D image, to determine a 3D predicted path of the vehicle; and
output a signal in dependence at least in part on the 3D predicted path.

The 3D Data May be a Point Cloud Dataset

The terrain information may comprise stereoscopic images of terrain ahead of the vehicle, for example in the form of a stream of video images from respective left and right video cameras. The terrain data capture means may be configured to pass the images to the terrain data processing means that may in turn be configured to generate 3D point cloud data from the stream of images.

Optionally, the processing means is configured to, prior to performing the segmentation operation, generate a colour and texture descriptor comprising colour information and texture information in respect of each pixel of the image, with the exception of the pixels defining the border of each image.

Optionally, the image data defining said one said at least one image comprises RGB colour space information in respect of each pixel, wherein the colour information for the colour and texture descriptor is generated by transforming the 2D image from RGB colour space to the 'Lab' colour space, wherein each colour and texture descriptor comprises three colour component descriptors L, a, b. Alternatively any alternative colour spaces such as HSV or illumination invariant RGB could be used.

Optionally, the texture information for the colour and texture descriptor (p_i) is generated by subtracting the intensity of a given pixel from the intensity of each of the 8 pixels surrounding that pixel, to give eight texture descriptors per pixel.

Optionally, the texture information comprises a weighting factor in respect of each colour component descriptor and each texture descriptor of each pixel.

Optionally, the processing means being configured to perform a segmentation operation on image data defining one said at least one 2D image and identify in the image data edges of a predicted path of the vehicle comprises the processing means being configured to perform a Gaussian Mixture Models (GMM)-based image segmentation technique with a statistical Expectation Maximization (EM) online learning scheme.

Optionally, the processing means being configured to perform a segmentation operation on image data defining one said at least one 2D image and identify in the image data edges of a predicted path of the vehicle comprises the processing means being configured to receive from a user or determine automatically an indication of a location in the image of at least one path region being a region of the image that is considered to be part of a traversable path of the vehicle, the processing means being configured to employ image data in respect of the at least one path region in determining edges of a predicted path.

Optionally, the processing means is configured to receive from a user an indication of a location in the image of at least one path region, the processing means being configured to superimpose an outline of predetermined shape defining a portion of the path region at at least one location indicated by the user.

Optionally, the processing means being configured to receive from a user an indication of a location in the image of at least one path region comprises the processing means being configured to receive the indication by means of a touch-screen.

Optionally, the processing means is configured to receive from a user or determine automatically an indication of a location in the image of at least one non-path region being a region of the image that is considered to not be part of a traversable path of the vehicle, the processing means being configured to employ image data in respect of at least one non-path region in determining edges of a predicted path.

Optionally, the processing means is configured to receive from a user an indication of a location in the image of at least one non-path region, the processing means being figured to superimpose an outline of predetermined shape defining a portion of a non-path region at at least one location indicated by the user.

Optionally, the processing means is configured to receive from a user an indication of a location in the image of non-path regions along left, right and top regions of the image.

Optionally, the processing means is configured to classify each pixel of the image as corresponding to one said at least one path region or one said at least one non-path region.

Optionally, the processing means is configured to identify, for each said at least one path region and each said at least one non-path region a region of the image comprising the largest number of connected pixels corresponding to that region, being a primary pixel block of that region, wherein any pixels of one region that are surrounded by pixels of a primary pixel block of another region are reclassified as corresponding to the primary block of said another region, and any pixels subsequently not belonging to a primary pixel block are reclassified as belonging to a secondary block.

It is to be understood that pixels of the secondary block may be considered to be newly labelled clusters. The process of reclassifying pixels may be referred to as a refinement process.

Optionally, the processing means is configured to identify pixels of the 3D point cloud corresponding to the primary block of pixels of the 2D image that correspond to the at least one path region.

Optionally, the processing means is configured to calculate a 'ground plane' of the path region based on the pixels of the 3D point cloud corresponding to the primary block of pixels.

Optionally, the processing means (10, 19) is configured to perform a refinement operation in which the processing means eliminates from the path region portions of the path region corresponding to obstacles not compatible with a traversable path based on height of the portions above the ground plane and subsequently identifies regions of a traversable path of the vehicle.

Thus the processing means may recognise that certain portions of the 3D predicted path may include one or more obstacles that the vehicle is likely to drive around and not over, and refine the 3D predicted path in dependence on the presence of any such obstacles. The obstacles may for example include objects such as bushes, trees, rocks or the like.

Thus, in some embodiments, obstacles representing a step change in height exceeding a predetermined amount, and/or obstacles presenting a gradient exceeding a predetermined amount, and/or obstacles having a combination of height and lateral extent not meeting one or more predetermined criteria may be considered to be regions of the predicted path that the vehicle is unlikely to traverse. Other arrangements may be useful.

Optionally, the processing means is configured to calculate a curvature of the 3D predicted path.

Optionally, the processing means is configured to fit at least one 3D curve to at least one region, which may be an edge. of the traversable path and to generate an estimate of path curvature based on the at least one 3D curve.

Optionally, the system is further configured to cause the vehicle to be controlled based at least in part on the 3D predicted path.

Optionally, the system comprises a speed controller, wherein the control system being configured to cause the vehicle to be controlled based at least in part on the 3D predicted path comprises the speed controller being configured to control vehicle speed based at least in part on the 3D predicted path.

Optionally, the system is configured to control vehicle speed based at least in part on the curvature of the 3D predicted path.

Optionally, the system is configured to provide an output to the speed controller indicative of a maximum recommended speed in dependence at least in part on the 3D predicted path.

Optionally, the system is configured to provide an output to the speed controller indicative of a maximum recommended speed in dependence at least in part on the curvature of the 3D predicted path.

The output to the speed control system indicative of maximum recommended speed in dependence at least in part on the curvature of the predicted path may be generated by reference to a look-up table in respect of maximum recommended speed as a function of path curvature.

The control system may further comprise the terrain data capture means.

Optionally, the terrain data capture means comprises a stereoscopic camera system.

The terrain information may comprise a stream of stereoscopic images of terrain ahead of the vehicle.

It is to be understood that other terrain data capture means may be useful in some embodiments, such as a radar-based terrain ranging system, a laser-based terrain ranging system or an acoustic ranging system.

Optionally, the control system may be configured to provide an output to a driver indicative of the curvature of the predicted path of the vehicle.

Optionally, the control system may be configured to provide an alert to a driver in dependence on the curvature of the predicted path.

Optionally, the system comprises an electronic processor having an electrical input for receiving the terrain information indicative of the topography of terrain ahead of the vehicle; and an electronic memory device electrically coupled to the electronic processor and having instructions stored therein, wherein the processor is configured to access the memory device and execute the instructions stored therein such that it is operable to:

perform a segmentation operation on image data defining one said at least one 2D image and identify in the image data edges of a predicted path of the vehicle;

calculate a 3D point cloud dataset in respect of the terrain ahead of the vehicle based on the terrain information;

determine the 3D coordinates of edges of the predicted path of the vehicle by reference to the point cloud dataset, based on the coordinates of edges of the predicted path identified in the 2D image, to determine a 3D predicted path of the vehicle.

In a further aspect of the invention for which protection is sought there is provided a vehicle comprising a system according to any preceding aspect.

In another aspect of the invention for which protection is sought there is provided a method of predicting the path of a vehicle, the method comprising:
receiving, from terrain data capture means arranged to capture data in respect of terrain ahead of the vehicle by means of one or more sensors, terrain information indicative of the topography of an area extending ahead of the vehicle, the terrain information comprising data defining at least one 2D image of the terrain ahead of the vehicle;
   performing a segmentation operation on image data defining one said at least one 2D image and identifying in the image data edges and/or a centreline of a predicted path of the vehicle;
   calculating 3D data in respect of the terrain ahead of the vehicle based on the terrain information;
   determining the 3D coordinates of edges and/or the centreline of the predicted path of the vehicle by reference to the 3D data, based on the coordinates of edges and/or centreline of the predicted path identified in the 2D image, to determine a 3D predicted path of the vehicle; and
   outputting a signal in dependence at least in part on the 3D predicted path.

In a further aspect of the invention for which protection is sought there is provided a method of controlling a vehicle, the method comprising predicting the path of a vehicle according to the method of the preceding aspect and causing the vehicle to be controlled based at least in part on the 3D predicted path.

In an aspect of the invention for which protection is sought there is provided a non-volatile carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a computer readable medium loaded with the computer program product of another aspect.

In an aspect of the invention for which protection is sought there is provided a processor arranged to implement the method of another aspect, or the computer program product of another aspect.

In one aspect of the invention for which protection is sought there is provided a control system for a vehicle, the system comprising a processing means arranged to receive, from terrain data capture means arranged to capture data in respect of terrain ahead of the vehicle by means of one or more sensors, terrain information indicative of the topography of an area extending ahead of the vehicle, wherein the terrain information comprises data defining at least one 2D image of the terrain ahead of the vehicle, wherein the processing means is configured to:
   perform a segmentation operation on image data defining one said at least one 2D image and identify in the image data edges and/or a centreline of a predicted path of the vehicle;
   calculate 3D data in respect of the terrain ahead of the vehicle based on the terrain information;
   determine the 3D coordinates of lateral edges and/or centreline of the predicted path of the vehicle by reference to the 3D data, based on the coordinates of edges and/or the centreline of the predicted path identified in the 2D image, to determine a 3D predicted path of the vehicle; and
   control the direction of travel of the vehicle in dependence at least in part on the 3D predicted path.

Optionally, the system is configured to determine a centreline of the predicted path defined by the lateral edges thereof and a lateral location of the vehicle with respect to the predicted path centreline, the system being configured to control the direction of travel of the vehicle in dependence on the predicted path centreline and lateral vehicle location relative to the predicted path centreline.

Optionally, the system is configured to control the direction of travel of the vehicle to maintain the vehicle within the lateral edges of the predicted path.

Optionally, the system is configured to control the direction of travel of the vehicle to maintain a substantially constant lateral distance of the vehicle centreline from the predicted path centreline.

Alternatively, the system may be configured to control the direction of travel of the vehicle to maintain a substantially constant lateral distance of the vehicle centreline from a lateral edge of the predicted path.

Optionally, the system is configured to control the direction of travel of the vehicle to maintain a substantially constant ratio between the distance of the vehicle centreline from the predicted path centreline and the distance of the vehicle centreline from the nearest lateral edge of the predicted path.

The path followed by the vehicle centreline may be referred to as a vehicle path line.

It is to be understood that, in some embodiments, the control system may be configured to cause the vehicle centreline to follow a vehicle path line that is substantially coincident with or parallel to the predicted path centreline, depending on the location of the vehicle centreline with respect to the predicted path centreline.

In some embodiments, the system may offset the predicted path centreline to define a vehicle path line parallel to the predicted path centreline that passes through the instant location of the vehicle along the vehicle centreline unless the centreline of the vehicle as viewed from above is substantially coincident with the predicted path centreline.

It is to be understood that the system may be configured to cause the vehicle to remain within the lateral path edges. Thus, if the vehicle centreline is offset from the path centreline and the distance between the path edges becomes such that the vehicle can only progress if it is located substantially at the path centreline, the system may cause the vehicle to travel along a vehicle path line that is substantially coincident with the path centreline.

Optionally, the system is configured to generate a vehicle path line that is substantially coincident with or parallel to the predicted path centreline, the system being configured to set a steering angle of the vehicle to an angle corresponding to the angle of a tangent to the vehicle path line at a predetermined tangent location along the vehicle path line.

Thus the system may calculate the angle of a tangent to the vehicle path line at the predetermined tangent location and set the steering angle to an angle corresponding to this angle. The angle may be substantially equal to this angle in some embodiments.

Optionally, the predetermined tangent location is a predetermined tangent distance ahead of the instant location of the vehicle along the vehicle path line.

The predetermined tangent distance may be any suitable distance such as 6 m, 3 m, 10 m or any other suitable distance ahead of the instant location of the vehicle.

Optionally, the predetermined location is set to a value in the range from 3 m to 10 m.

Other values, for example in the range from 1 m to 3 m, 1 m to 10 m or any other suitable value may be useful in some embodiments.

Optionally, the data defining at least one 2D image of the terrain ahead of the vehicle comprises terrain colour information, and the processing means is configured to, prior to performing the segmentation operation, generate a colour and texture descriptor comprising colour information and texture information in respect of each pixel of the image, with the exception of the pixels defining the border of each image.

Optionally, the image data defining said one said at least one image comprises RGB colour space information in respect of each pixel, wherein the colour information for the colour and texture descriptor is generated by transforming the 2D image from RGB colour space to the 'Lab' colour space, wherein each colour and texture descriptor comprises three colour component descriptors L, a, b.

Optionally, the texture information for the colour and texture descriptor is generated by subtracting the intensity of a given pixel from the intensity of each of the 8 pixels surrounding that pixel, to give eight texture descriptors per pixel.

Optionally, the texture information comprises a weighting factor in respect of each colour component descriptor and each texture descriptor of each pixel.

Optionally, the processing means being configured to perform a segmentation operation on image data defining one said at least one 2D image and identify in the image data edges of a predicted path of the vehicle comprises the processing means being configured to perform a Gaussian Mixture Models (GMM)-based Expectation Maximization (EM) image segmentation technique with an online learning scheme.

Optionally, the processing means being configured to perform a segmentation operation on image data defining one said at least one 2D image and identify in the image data edges of a predicted path of the vehicle comprises the processing means being configured to receive from a user or determine automatically an indication of a location in the image of at least one path region being a region of the image that is considered to be part of a traversable path of the vehicle, the processing means being configured to employ image data in respect of the at least one path region in determining edges of a predicted path.

Optionally, the processing means is configured to receive from a user an indication of a location in the image of at least one path region, the processing means being configured to superimpose an outline of predetermined shape defining a portion of the path region at at least one location indicated by the user.

Optionally, the processing means being configured to receive from a user an indication of a location in the image of at least one path region comprises the processing means being configured to receive the indication by means of a touch-screen.

Optionally, the processing means is configured to receive from a user or determine automatically an indication of a location in the image of at least one non-path region being a region of the image that is considered to not be part of a traversable path of the vehicle, the processing means being configured to employ image data in respect of at least one non-path region in determining edges of a predicted path.

Optionally, the processing means is configured to receive from a user an indication of a location in the image of at least one non-path region, the processing means being configured to superimpose an outline of predetermined shape defining a portion of a non-path region at least one location indicated by the user.

Optionally, the processing means is configured to receive from a user an indication of a location in the image of non-path regions along left, right and top edges of the image.

Optionally, the processing means is configured to classify each pixel of the image as corresponding to one said at least one path region or one said at least one non-path region.

Optionally, the processing means is configured to identify, for each said at least one path region and each said at least one non-path region a region of the image comprising the largest number of connected pixels corresponding to that region, being a primary pixel block of that region, wherein any pixels of one region that are surrounded by pixels of a primary pixel block of another region are reclassified as corresponding to the primary block of said another region, and any pixels subsequently not belonging to a primary pixel block are reclassified as belonging to a secondary block.

Optionally, the processing means is configured to identify pixels of the 3D point cloud corresponding to the primary block of pixels of the 2D image that correspond to the at least one path region.

Optionally, the processing means is configured to calculate a 'ground plane' of the path region based on the pixels of the 3D point cloud corresponding to the primary block of pixels.

Optionally, the processing means is configured to perform a refinement operation in which the processing means eliminates from the path region edge portions of the path region corresponding to obstacles not compatible with a traversable path based on height of the portions above the ground plane and subsequently identifies edges of a traversable path of the vehicle.

Optionally, the processing means is configured to calculate a curvature of the 3D predicted path.

Optionally, the processing means is configured to fit at least one 3D curve to at least one edge of the traversable path and to generate an estimate of path curvature based on the at least one 3D curve.

Optionally, the processing means is configured to generate a first estimate of surface roughness of terrain ahead of the vehicle based at least in part on terrain information indicative of the topography of the area extending ahead of the vehicle.

Optionally, the processing means is configured to generate the first estimate of surface roughness of terrain ahead of the vehicle based at least in part in further dependence on a current measured value of surface roughness generated based on sensor data indicative of movement of a body of the vehicle.

Optionally, the processing means is configured to access stored data correlating historical captured terrain information indicative of topography of terrain extending ahead of the vehicle based on data captured by the terrain data capture means with historical measurements of values of surface roughness as the vehicle traversed the terrain, and to correlate the historical terrain information with terrain information in respect of current topography of terrain ahead of the vehicle captured by the terrain data capture means, the processing means being configured to generate a second, refined, estimate of surface roughness based on the historical, stored, values of surface roughness in respect of terrain that corresponds to the terrain information in respect of current topography of terrain ahead of the vehicle.

The system may comprise a speed controller, the speed controller being configured to control vehicle speed based at least in part on the 3D predicted path.

The system may be configured to control vehicle speed based at least in part on the curvature of the 3D predicted path.

The system may be configured to provide an output to the speed controller indicative of a maximum recommended speed in dependence at least in part on the curvature of the 3D predicted path.

The control system may be configured to provide an output to the speed controller indicative of a maximum recommended speed in further dependence at least in part on the first estimate of surface roughness.

The control system may be configured to provide an output to the speed controller indicative of a maximum recommended speed in further dependence at least in part on the second estimate of surface roughness.

The control system may further comprise the terrain data capture means.

Optionally, the terrain data capture means comprises a stereoscopic camera system.

The control system may be configured to provide an alert to a driver in dependence on the curvature of the predicted path.

Further optionally, the system comprises an electronic processor having an electrical input for receiving the terrain information indicative of the topography of terrain ahead of the vehicle; and
 an electronic memory device electrically coupled to the electronic processor and having instructions stored therein,
 wherein the processor is configured to access the memory device and execute the instructions stored therein such that it is operable to:
 perform a segmentation operation on image data defining one said at least one 2D image and identify in the image data edges of a predicted path of the vehicle;
 calculate a 3D point cloud dataset in respect of the terrain ahead of the vehicle based on the terrain information;
 determine the 3D coordinates of edges of the predicted path of the vehicle by reference to the point cloud dataset, based on the coordinates of edges of the predicted path identified in the 2D image, to determine a 3D predicted path of the vehicle; and
 cause the direction of travel of the vehicle to be controlled in dependence at least in part on the 3D predicted path.

In a further aspect of the invention for which protection is sought there is provided a vehicle comprising a system according to any other aspect.

In an aspect of the invention for which protection is sought there is provided a method of predicting the path of a vehicle, the method comprising:
 receiving, from terrain data capture means arranged to capture data in respect of terrain ahead of the vehicle by means of one or more sensors, terrain information indicative of the topography of an area extending ahead of the vehicle, the terrain information comprising data defining at least one 2D image of the terrain ahead of the vehicle;
 performing a segmentation operation on image data defining one said at least one 2D image and identifying in the image data edges and/or a centreline of a predicted path of the vehicle;
 calculating 3D data in respect of the terrain ahead of the vehicle based on the terrain information;
 determining the 3D coordinates of edges and/or the centreline of the predicted path of the vehicle by reference to the 3D data, based on the coordinates of edges and/or the centreline of the predicted path identified in the 2D image, to determine a 3D predicted path of the vehicle; and
 control the direction of travel of the vehicle in dependence at least in part on the 3D predicted path.

The method may comprise determining a centreline of the predicted path defined by the lateral edges thereof and a lateral location of the vehicle with respect to the predicted path centreline, and controlling the direction of travel of the vehicle in dependence on the predicted path centreline and lateral vehicle location relative to the predicted path centreline.

The method may comprise controlling the direction of travel of the vehicle to maintain the vehicle within the lateral edges of the predicted path.

The method may comprise controlling the direction of travel of the vehicle to maintain a substantially constant lateral distance of the vehicle centreline from the predicted path centreline.

The method may comprise controlling the direction of travel of the vehicle to maintain a substantially constant ratio between the distance of the vehicle centreline from the predicted path centreline and the distance of the vehicle centreline from the nearest lateral edge of the predicted path.

The method may comprise generating a vehicle path line that is substantially coincident with or parallel to the predicted path centreline, the method comprising setting a steering angle of the vehicle to an angle corresponding to the angle of a tangent to the vehicle path line at a predetermined location along the vehicle path line.

The method may comprise setting the predetermined location to be a predetermined distance ahead of the instant location of the vehicle along the vehicle path line.

The method may comprise setting the predetermined location substantially to the instant location of the vehicle.

In one aspect of the invention for which protection is sought there is provided a non-transitory computer readable carrier medium carrying computer readable code for controlling a vehicle to carry out the method of a preceding aspect.

In a further aspect of the invention for which protection is sought there is provided a computer program product executable on a processor so as to implement the method of a preceding aspect.

In a still further aspect of the invention for which protection is sought there is provided a non-transitory computer readable medium loaded with the computer program product of another aspect.

In an aspect of the invention for which protection is sought there is provided a processor arranged to implement the method or the computer program product of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

The present invention will now be described, by way of example only, with reference to the accompanying drawings, in which:

FIG. 5 illustrates the manner in which a colour and texture descriptor p_i is generated during processing of a captured image;

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
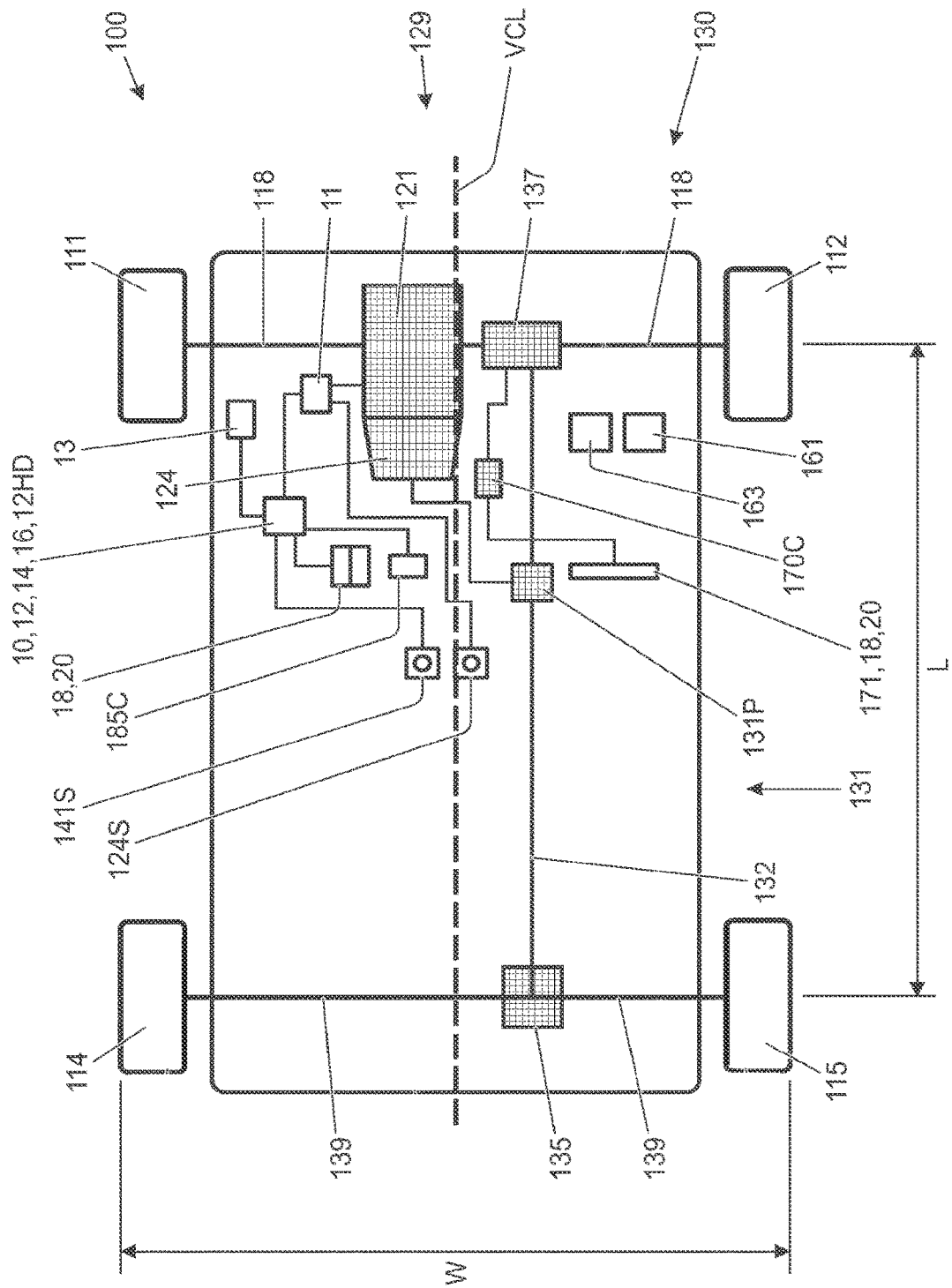
FIG. 1 is a schematic illustration of a vehicle according to an embodiment of the invention in plan view.
Figure 2:
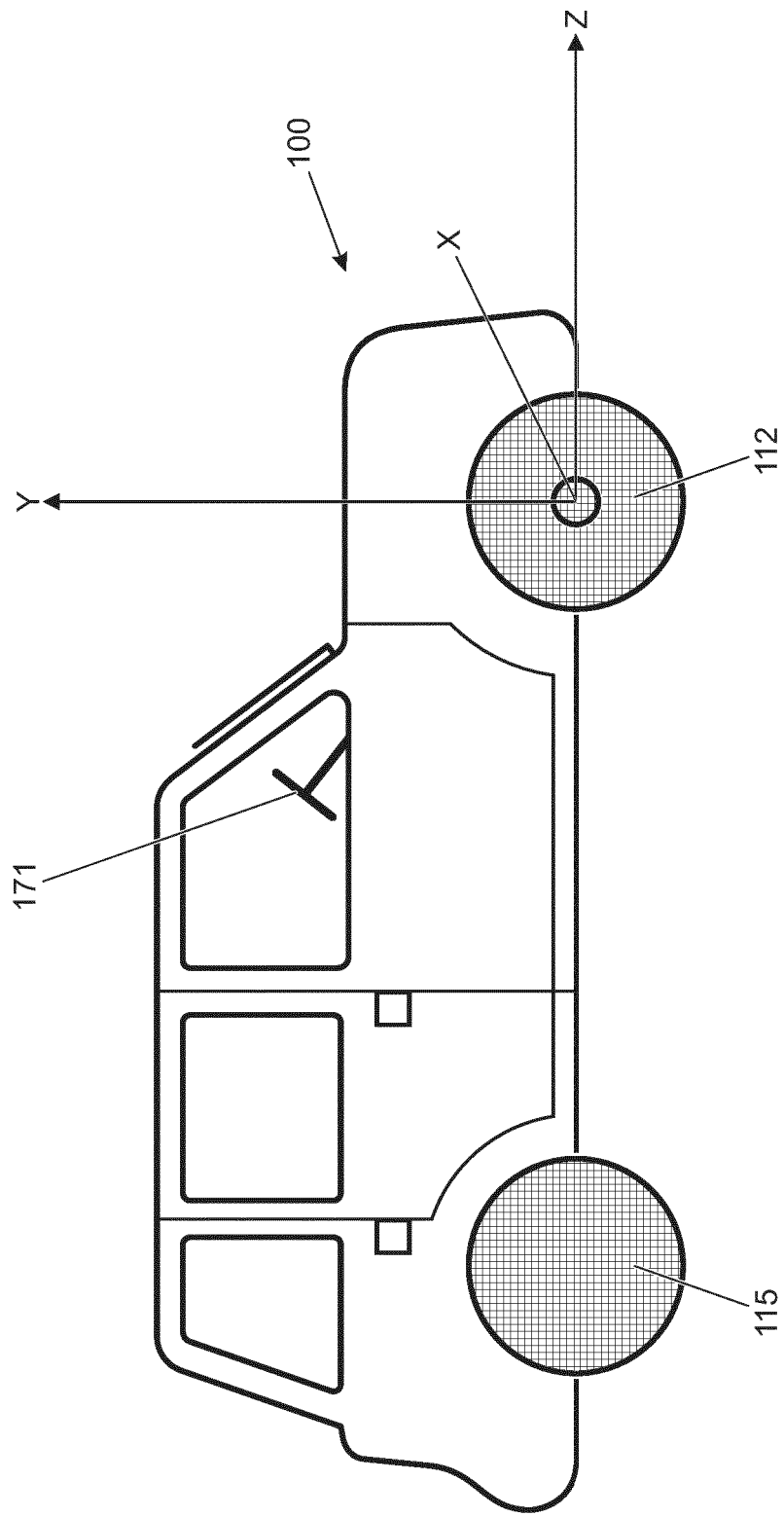
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
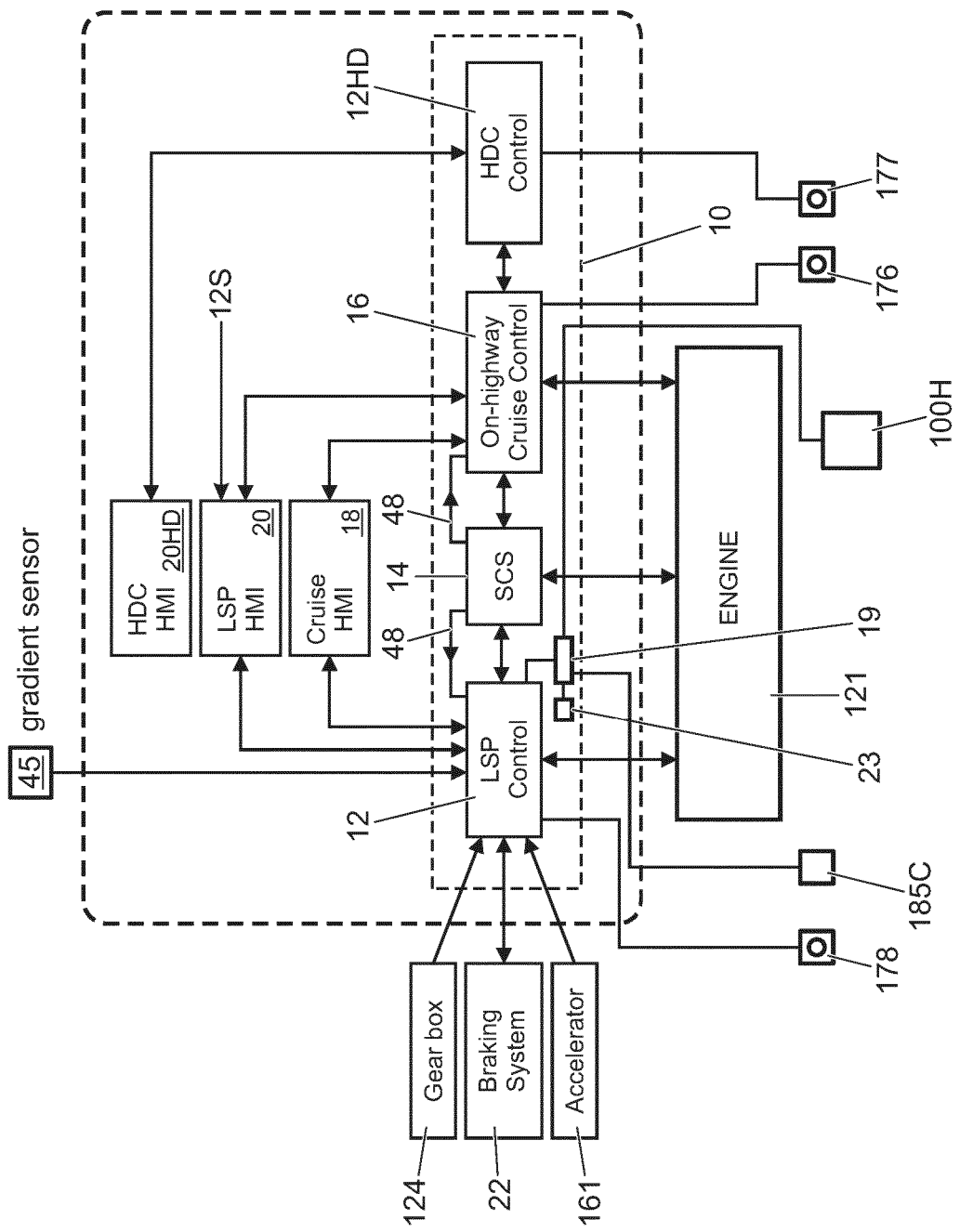
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 (an anti-lock braking system (ABS) controller) and a steering controller 170C. The ABS controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14, a cruise control system 16 and a hill descent control (HDC) system 12HD. The SCS 14 improves the safety of the vehicle 100 by detecting and managing loss of traction or steering control. When a reduction in traction or steering control is detected, the SCS 14 is operable automatically to command the ABS controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the ABS controller 13.

Although not shown in detail in FIG. 3, the VCU 10 further includes a Traction Control (TC) function block. The TC function block is implemented in software code run by a computing device of the VCU 10. The ABS controller 13 and TC function block provide outputs indicative of, for example, TC activity, ABS activity, brake interventions on individual wheels and engine torque requests from the VCU 10 to the engine 121 in the event a wheel slip event occurs. Each of the aforementioned events indicate that a wheel slip event has occurred. In some embodiments the ABS controller 13 implements the TC function block. Other vehicle sub-systems such as a roll stability control system or the like may also be included.

Figure 4:
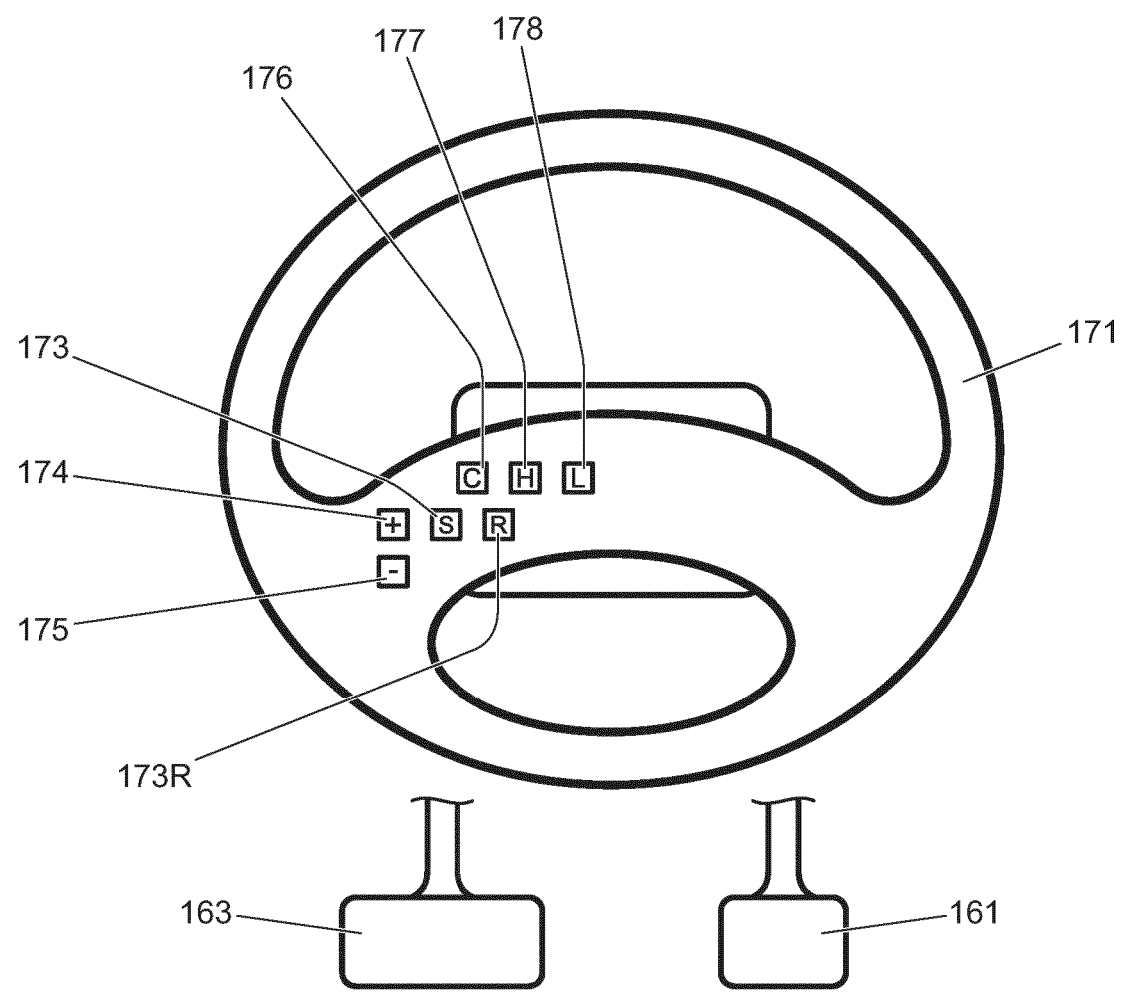
FIG. 4 illustrates a steering wheel of a vehicle according to the embodiment of FIG. 1.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, control of vehicle speed by the cruise control system 16 is cancelled and the vehicle 100 reverts to a manual mode of operation which requires accelerator or brake pedal input by a user in order to maintain vehicle speed. In addition, detection of a wheel slip event, as may be initiated by a loss of traction, also has the effect of cancelling control of vehicle speed by the cruise control system 16. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user to maintain vehicle speed. Low-speed speed control (or progress control) functionality is not provided by the on-highway cruise control system 16 which operates only at speeds above 25 kph.

In the present embodiment, the LSP control system 12 is activated by pressing LSP control system selector button 178 mounted on steering wheel 171. The system 12 is operable to apply selective powertrain, traction control and braking actions to one or more wheels of the vehicle 100, collectively or individually.

The LSP control system 12 is configured to allow a user to input a desired value of vehicle target speed in the form of a set-speed parameter, user_set-speed, via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system 12 (which is the range from 2 to 30 kph in the present embodiment although other ranges are also useful) and no other constraint on vehicle speed exists whilst under the control of the LSP control system 12, the LSP control system 12 controls vehicle speed in accordance with a LSP control system set-speed value LSP_set-speed which is set substantially equal to user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, the desired value of user_set-speed as noted above by means of the 'set-speed' button 173 and the '+'/'−' buttons 174, 175 in a similar manner to the cruise control system 16. The LSP HMI 20 also includes a visual display by means of which information and guidance can be provided to the user about the status of the LSP control system 12.

The LSP control system 12 receives an input from the ABS controller 13 of the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161, and an input from the transmission or gearbox 124. This latter input may include signals representative of, for example, the speed of an output shaft of the gearbox 124, an amount of torque converter slip and a gear ratio request. Other inputs to the LSP control system 12 include an input from the cruise control HMI 18 which is representative of the status (ON/OFF) of the cruise control system 16, an input from the LSP control HMI 20, and an input from a gradient sensor 45 indicative of the gradient of the driving surface over which the vehicle 100 is driving. In the present embodiment the gradient sensor 45 is a gyroscopic sensor. In some alternative embodiments the LSP control system 12 receives a signal indicative of driving surface gradient from another controller such as the ABS controller 13. The ABS controller 13 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. Methods for the calculation of vehicle reference speed based for example on vehicle wheel speeds are well known. For example in some known vehicles the vehicle reference speed may be determined to be the speed of the second slowest turning wheel, or the average speed of all the wheels. Other ways of calculating vehicle reference speed may be useful in some embodiments, including by means of a camera device or radar sensor.

The HDC system 12HD is activated by depressing button 177 comprised by HDC system HMI 20HD and mounted on the steering wheel 171. When the HDC system 12HD is active, the system 12HD controls the braking system 22 in order to limit vehicle speed to a value corresponding to that of a HDC set-speed parameter HDC_set-speed which may be controlled by a user in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph. The HDC_set-speed parameter may also be referred to as an HDC target speed. Provided the user does not override the HDC system 12HD by depressing the accelerator pedal 161 when the HDC system 12HD is active, the HDC system 12HD controls the braking system 22 (FIG. 3) to prevent vehicle speed from exceeding HDC_set-speed. In the present embodiment the HDC system 12HD is not operable to apply positive drive torque. Rather, the HDC system 12HD is only operable to cause negative brake torque to be applied, via the braking system 22.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response (TR) modes, or control modes.

In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterised at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. Other driving modes may be provided in addition or instead. In the present embodiment the selector 141S also allows a user to select an 'automatic driving mode selection condition' of operation in which the VCU 10 selects automatically the most appropriate driving mode as described in more detail below. The on-highway driving mode may be referred to as a 'special programs off' (SPO) mode in some embodiments since it corresponds to a standard or default driving mode, and is not required to take account of special factors such as relatively low surface coefficient of friction, or surfaces of high roughness.

In order to prevent or at least reduce passenger discomfort due to rapid changes in acceleration rate (jerk) when the LSP control system 12 is controlling vehicle speed, the LSP control system 12 limits the rate of change of acceleration of the vehicle 100 such that it does not exceed a prescribed maximum value. The maximum allowable rate of change of acceleration or maximum allowable jerk value is provided by parameter LSP_J_MAX. The LSP control system 12 also limits the maximum value of rate of acceleration to a value LSP_A_MAX.

The values of LSP_A_MAX and LSP_J_MAX are set in dependence at least in part on TR mode and vehicle speed. In some embodiments, including the present embodiment, the values for TR_mode=sand are higher than the corresponding values for TR_mode=SPO, GGS or MR due to the higher drag imposed on a vehicle 100 traversing sand compared with a vehicle traversing a dry asphalt highway surface, a grass, gravel or snow surface, or a muddy or rutted surface.

The LSP control system 12 causes the vehicle 100 to operate in accordance with the value of LSP_set-speed.

In order to cause application of the necessary positive or negative torque to the wheels, the VCU 10 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In some embodiments torque is applied to the vehicle wheels individually, for example by powertrain torque vectoring, so as to maintain the vehicle at the required speed. Alternatively, in some embodiments torque may be applied to the wheels collectively to maintain the required speed, for example in vehicles having drivelines where torque vectoring is not possible. In some embodiments, the powertrain controller 11 may be operable to implement torque vectoring to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements may also be useful.

Where a powertrain 129 includes one or more electric machines, for example one or more propulsion motors and/or generators, the powertrain controller 11 may be operable to modulate torque applied to one or more wheels in order to implement torque vectoring by means of one or more electric machines.

In some embodiments the LSP control system 12 may receive a signal wheel_slip (also labelled 48 in FIG. 3) indicative of a wheel slip event having occurred. This signal 48 is also supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation on receipt of wheel_slip signal 48. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels (by the powertrain 129 and braking system 22) so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 16 resumed by pressing the resume button 173R or set-speed button 173.

The vehicle 100 is also provided with additional sensors (not shown) which are representative of a variety of different parameters associated with vehicle motion and status. These may be inertial systems unique to the LSP or HDC control systems 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle 100 is travelling.

The sensors (not shown) on the vehicle 100 include, but are not limited to, sensors which provide continuous sensor outputs to the VCU 10, including wheel speed sensors, as mentioned previously, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit) 170C. The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C. The ePAS unit 170C also provides a signal indicative of steering wheel rotational position or angle. The steering controller 170C is also configured to set the steering angle of the steerable road wheels to a desired value, using electric motors forming part of the ePAS unit. Thus, the vehicle 100 is configured to implement autonomous steering control when required.

In the present embodiment, the VCU 10 evaluates the various sensor inputs to determine the probability that each of the plurality of different TR modes (control modes or driving modes) for the vehicle subsystems is appropriate, with each control mode corresponding to a particular terrain type over which the vehicle is travelling (for example, mud and ruts, sand, grass/gravel/snow) as described above.

If the user has selected operation of the vehicle in the automatic driving mode selection condition, the VCU 10 then selects the most appropriate one of the control modes and is configured automatically to control the subsystems according to the selected mode. This aspect of the invention is described in further detail in our co-pending patent applications GB2492748, GB2492655 and GB2499279, the contents of each of which is incorporated herein by reference as noted above.

As indicated above, the nature of the terrain over which the vehicle is travelling (as determined by reference to the selected control mode) may also be utilised in the LSP control system 12 to determine an appropriate increase or decrease in vehicle speed. For example, if the user selects a value of user_set-speed that is not suitable for the nature of the terrain over which the vehicle is travelling, the system 12 is operable to automatically adjust the value of LSP_set-speed to a value lower than user_set-speed. In some cases, for example, the user selected speed may not be achievable or appropriate over certain terrain types, particularly in the case of uneven or rough surfaces. If the system 12 selects a set-speed (a value of LSP_set-speed) that differs from the user-selected set-speed user_set-speed, a visual indication of the speed constraint is provided to the user via the LSP HMI 20 to indicate that an alternative speed has been adopted.

Other arrangements may be useful.

In the present embodiment, the vehicle 100 is provided with a stereoscopic camera system 185C configured to generate stereo colour image pairs by means of a pair of forward-facing colour video cameras comprised by the system 185C. A stream of dual video image data is fed from the cameras to the VCU 10 which processes the image data received in a processing portion 19 and repeatedly generates a 3D point cloud data set based on the images received. Techniques for generating 3D point cloud data sets based on stereoscopic image data are well known. Each point in the 3D point cloud data set corresponds to a 3D coordinate of a point on a surface of terrain ahead of the vehicle 100 viewed by each of the forward-facing video cameras of the stereoscopic camera system 185C.

In the present embodiment the 3D point cloud dataset is transformed such that the origin of the frame of reference of the dataset is the midpoint of a line joining the points at which the two front wheels 111, 112 of the vehicle 100 touch the ground over which the vehicle 100 is driving. In the present embodiment the frame of reference is defined with respect to Cartesian coordinates X, Y, Z where X is an axis transverse to the direction of vehicle travel, i.e. along a lateral direction with respect to the vehicle 100, Y is an axis oriented in an upward direction with respect to the vehicle 100, corresponding to a substantially vertically upward direction when the vehicle 100 is parked on level ground, and Z is parallel to or coincident with a longitudinal axis of the vehicle 100, along the direction of travel of the vehicle 100.

The processing portion 19 is configured to determine a predicted path of the vehicle initially by reference to 2D images captured by the stereoscopic camera system 185C. In the present embodiment, the processing portion 19 takes the left-hand image of the most recently captured stereoscope image pair. The processing portion 19 then generates a colour and texture descriptor p_i for each pixel of the image, with the exception of the pixels defining the border of each image. In some embodiments the right-hand image may be used instead.

Colour information for the descriptor p_i is generated by transforming the 2D image from RGB colour space (being the form in which it is generated by the camera system 185C), or an alternative colour space, to the 'Lab' colour space. It is to be understood that colours in the Lab colour space are known to be more perceptually linear to the human eye than colours in the RGB space, enabling improved clusters to be generated when image clustering (described below) is performed.

The processing portion 19 also generates texture information in respect of each pixel of the image, with the exception of the pixels defining the border of each image. It is to be understood that texture is a measure of the local spatial variation in the intensity of an image. The texture information is generated by subtracting the intensity of a given pixel from the intensity of each of the 8 pixels surrounding that pixel, to give eight texture descriptors per pixel. Each colour and texture descriptor therefore contains eleven components: three colour components L, a, b and eight texture components. FIG. 5 illustrates the manner in which colour and texture descriptor p_i is generated; subject pixel S, of intensity Lc, is shown surrounded by pixels S1 to S8 of intensity L1 to L8, respectively. Lc, ac and be are the 'Lab' colour components of pixel Lc. The set of weights {W1, W2, W3} is used to balance how much to rely on colour, texture, and brightness for image clustering.

The processing portion 19 then performs an image segmentation technique, in the present embodiment a 'Gaussian Mixture Models (GMM)'-based Expectation Maximization (EM) image segmentation technique. The processing portion then applies an online learning scheme for off-road path detection and online learning clustering and path recognition. The technique automatically updates training data for online training which reduces the possibility of misclassifying road and non-road terrain and improves the adaptability of the off-road path detection algorithm.

Figure 6:
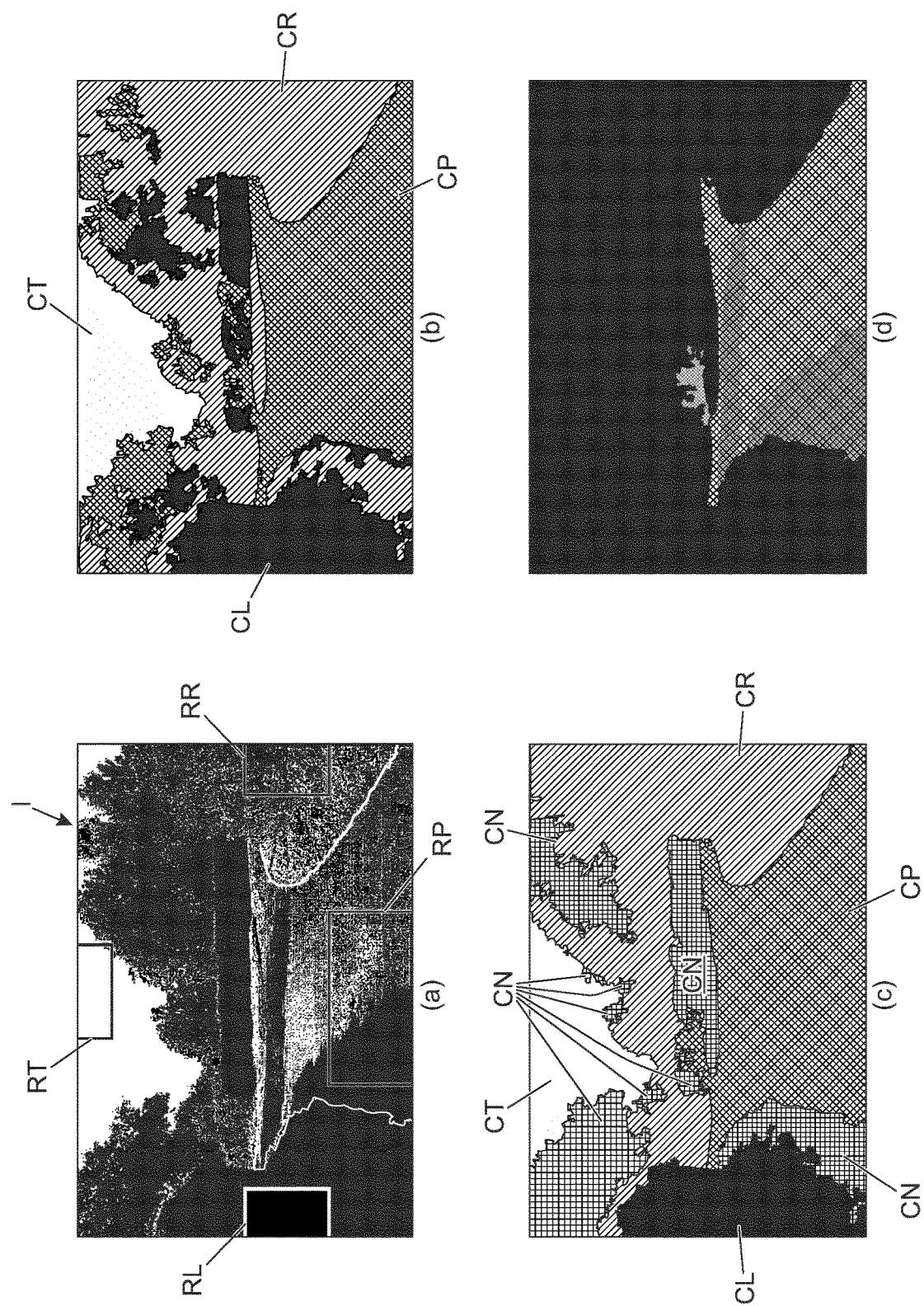
FIG. 6 shows (a) an example of an image captured by a stereoscopic camera system and displayed on a touch screen of a vehicle HMI, (b) the image of FIG. 6(*a*) following application of a GMM EM-based image segmentation technique, (c) the image of FIG. 6(*b*) following refinement, and (d) the image of FIG. 6(*a*) with only pixels of cluster CP of FIG. 6(*c*) visible.

When the LSP control system 12 is first activated by a user, the processing portion 19 generates a 2D image based on the left image of a given stereo colour image pair as stated above and displays the image on a touch screen display that forms part of a vehicle HMI 100H. FIG. 6(*a*) shows an example of an image I captured by the stereoscopic camera system 185C and displayed on the touch screen of the HMI 100H. It will be appreciated that alternatively the right image of the stereo colour pair could be used.

The user is requested to define, in the image I, a relatively small rectangular 'path region' RP of the image in front of the vehicle 100 (along a lower edge or region of the image) that is considered to be part of a traversable path of the vehicle 100, and three further rectangular regions RL, RR, RT along left, right and top edges or regions of the image, respectively, that do not form part of the traversable path. The four rectangular regions may be described as 'training regions'. The GMM EM-based image segmentation technique is then applied to the 2D image based on the four initial training regions RP, RL, RR, RT defined by the user. In cases where heavy shadows or colour changes are present in the image on the path, the user can define further rectangular regions (for example, but not exclusively, up to two further rectangular regions), which cover the areas with shadows or road colour changes, as extra traversable path samples for initial training of the processing portion 19 to detect the path of the vehicle 100 in the image I.

In some embodiments, the processing portion 19 is configured automatically to choose a central, bottom region of the image I as an initial path region or reference sample, and left, right and top edge regions of the image as initial 'non-path' regions for initial training.

In the present embodiment the user is prompted to indicate the location of the training regions by touching a touch-screen displaying the image I at the corresponding locations that the user wishes to act as training regions. The processing portion then superimposes rectangular outlines that define the boundary of the respective training regions.

FIG. 6(*b*) shows the image I of FIG. 6(*a*) following application of the GMM EM-based image segmentation technique. The segmentation technique may be considered to classify each pixel of the image as having texture and colour corresponding to that of the features of the image that were enclosed by the rectangles of the four initial training regions RP, RL, RR, RT defined by the user. Thus, as can be seen from FIG. 6(*b*), the image is now composed of pixels that are one of only four colours, each colour indicative of terrain corresponding to one of the four initial training regions RP, RL, RR, RT. Examples of clusters of pixels corresponding to the four initial training regions RP, RL, RR, RT are shown at CP, CL, CR and CT, respectively, in FIG. 6(*b*).

As can be seen in FIG. 6(*b*), application of the initial clustering step can result in an image with a not insignificant amount of noise in terms of the distribution of pixels of one or more colours. A refinement process is therefore applied to further improve the segmentation, in which only the largest connected-component of pixels of a given colour is retained, and unretained regions of pixels are labelled as a new cluster and assigned a new predetermined colour. For each of the retained components, any pixels that are entirely surrounded by that component that are not of the same colour as that component, are reassigned as belonging to that component. FIG. 6(*c*) shows the image I following refinement, with some of the newly labelled clusters of pixels labelled CN. These pixels may be considered to be secondary blocks of pixels, whilst clusters of pixels corresponding to the four initial training regions RP, RL, RR, RT may be referred to as primary blocks of pixels.

Dynamic adjustment of the positions of the four training regions RP, RL, RR, RT may then be performed based on image segmentation performed on previous frames. For example, the location of the path region RP may be adjusted frame by frame in dependence at least in part on steering angle, the path region RP moving to the left if the steering angle indicates a turn to the left and the path region RP moving to the right if the steering angle indicates a turn to the right.

In addition, in order to deal with heavy shadow or colour and texture changes on the path, two more path reference regions RP2, RP3 may be extracted within the previous detected path area above the bottom path reference region RP. These two extra additional path reference areas RP2, RP3 are arranged to be above the bottom path reference RP but below the path vanish point, optionally just below the vanish point. They may be user-defined in some embodiments, or alternatively they may be dynamically defined automatically by the processing portion 19 based on previous path detection results. The processing portion 19 may attempt to dynamically define the additional path reference areas RP2, RP3 based at least in part on an assumption that a change in trajectory of the path is small from frame to frame, and relatively smooth.

In some embodiments time averaging of the shape of clusters CP, CL, CR, CT may be performed.

The processing portion 19 continues on the basis that region CP of FIG. 6 represents the path of the vehicle 100 ahead. By way of illustration of the power of the technique described, FIG. 6(*d*) shows the image I of FIG. 6(*a*) I with only pixels of cluster CP visible. It can be seen that the accuracy with which the path has been predicted is high.

The processing portion 19 subsequently identifies, in the 3D point cloud, the pixels corresponding to cluster CP in FIG. 6(*c*), which will be referred to as potential path pixels. The processing portion 19 attempts to identify a 'ground plane' of the path of the vehicle corresponding to the potential path pixels. The processing portion 19 then identifies edges of the path by eliminating potential path pixels at the lateral edges that are at relatively large heights above the ground plane. Thus, potential obstacles at the edges of the path such as bushes, trees, rocks or the like may be eliminated as being areas the vehicle 100 may drive over. The processing portion 19 then determines the location of lateral edges of the predicted path following elimination of lateral obstacles. From this information, the processing portion 19 fits a 3D curve to define a 'centreline' of the path defined by the lateral edges. The centreline may be considered to be a centreline of a 3D predicted path of the vehicle 100. It is to be understood that, in some embodiments, the data defining the centreline prior to curve fitting may be considered to define the centreline of the 3D predicted path.

Figure 7:
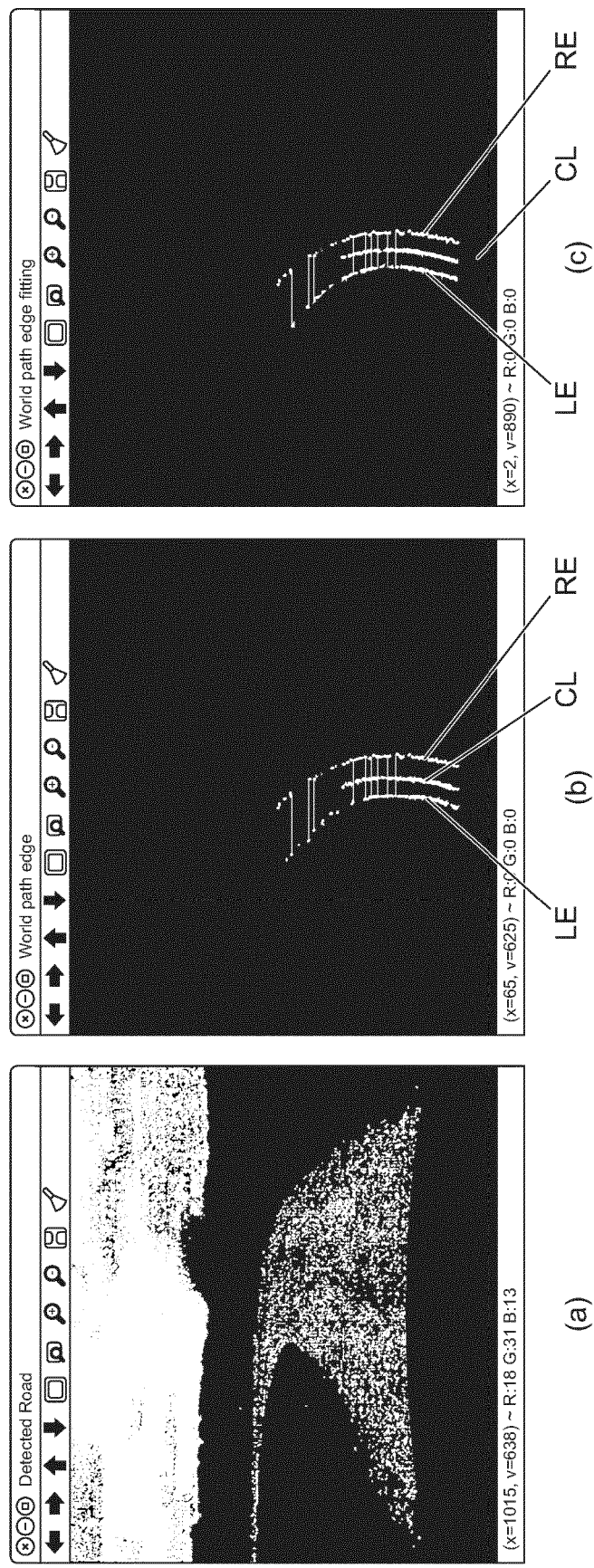
FIG. 7 shows (a) an example of a further image captured by a stereoscopic camera system and displayed on a touch screen of a vehicle HMI, (b) an image corresponding to that shown in (a) but with terrain viewed from above and in which pixels in the image of (a) that have been determined to correspond to left and right lateral edges of the path or a centreline CL of the path are shown in white, and (c) an image corresponding to that shown in (b) in which a pair of 3D curves have been fitted to the data corresponding to the left and right lateral edges of the path to define lateral edges of a 3D predicted path.

FIG. 7 illustrates schematically this process. FIG. 7(*a*) shows an example of an image (I) (in this example, a left image of a stereoscopic image pair) captured by the stereoscopic camera system 185C. The processing portion 19 detects pixels in the image (I) corresponding to left and right lateral edges LE, LR of the path, respectively, and determines which data points of the 3D point cloud correspond to these pixels. FIG. 7(*b*) is a plan view of the predicted path in an Xe-Ze plane as viewed along a vertical axis Ye in 'real world' coordinates where the Xe-Ze plane is a substantially horizontal plane. The pixels are therefore shown projected onto the Xe-Ze plane. The processing portion 19 then calculates a centreline CL of the 3D predicted path using a standard image processing algorithm. Finally, the processing portion 19 performs a curve fitting operation in which the processing portion 19 fits a 3D curve to the 3D datapoints defining the lateral edges LE, RE and centreline CL of the predicted path in the 3D point cloud in order to calculate a curvature of the predicted path. The processing portion 19 accomplishes this by fitting respective 2D curves to a projection of the datapoints defining the edges LE, RE and centreline CL of the 3D predicted path onto the Xe-Ze plane, before calculating corresponding values of curvature. The curves are fitted using a third order polynomial model with the constraint of a substantially constant road width and the condition that road centreline must pass through the origin of the coordinate system.

FIG. 7(c) is a plan view of the predicted path in the Xe-Ye plane as viewed along the vertical axis Ze showing the curves fitted to the edges LE, RE and centreline CL.

In some alternative embodiments, respective 3D curves may be fitted to the 3D coordinates defining the left and right edges and centreline of the predicted path, without first projecting the coordinates onto a 2D plane and undertaking curve fitting within the 2D plane. Other arrangements may be useful in some embodiments.

The three polynomial curve fittings of the left, right and central line of the path are evaluated frame by frame based on the RMSE (root mean square error) between the original data and the fitted data. If the RMSE of a curve is found to exceed a predetermined value, the fitting is considered to be a 'fail'. In case that one or two fittings are considered to fail due to an error in path edge detection or if no path edge is detected (for example, because the camera system 185C cannot see the inside edge of a curved path), the poorly fitting polynomials can be recovered from the good fitting output based on a polynomial model of the road. It is to be understood that, in the present embodiment, the assumption is made that the road polynomial model is a third order polynomial with a certain width. If any one or two of the three polynomial curves (left, right edges and centreline) are known, then we can recover the other one or two using the polynomial road model.

It is possible that all three fittings may fail, for example due to a low quality of path detection results or the camera system 185C cannot see the path at a tight corner, or the current road cannot be represented by the third order polynomial such as in a junction area. In such cases, the system may be able to establish a path model by reference to a set of previous good curve fitting results based on transformation of the vehicle orientation in real world coordinate systems.

Finally, the detected path is simplified to three polynomial curves in real world coordinates, and the curvature or radius at any distance of the detected path can be easily mathematically calculated from these three polynomials. The path detection and prediction algorithm can work at an operating speed of 15 frames per second from a video sequence having a resolution of 1024×512 pixels.

It is to be understood that the processing portion 19 is able to determine vehicle orientation with respect to real world coordinates, i.e. by reference to coordinates (a reference frame) fixed with respect to earth, and not with respect to the vehicle 100, by reference to vehicle orientation data supplied by an inertial measurement unit (IMU) 23 as shown in FIG. 3.

It is to be understood that some embodiments of the present invention utilising stereoscopic image data have the advantage that more accurate path curvature estimation in 3D is achievable, compared with a monocular camera system, where vehicle body motion results in less reliable path curvature estimates, especially at long range. A further advantage of some embodiments employing stereoscopic image data, including the present embodiment which employs the Gaussian Mixture Models (GMM)-based image segmentation technique with a statistical Expectation Maximization (EM) online learning scheme described herein, is that reliable path detection is possible even in the presence of repeated shadows or colour changes on the path. Some embodiments are even robust to heavy shadows or relatively large colour changes that may suddenly appear along the course of the path as the vehicle 100 traverses the path. It is to be understood that most existing path detection techniques fail to accurately detect the correct predicted path under such circumstances.

Figure 8:
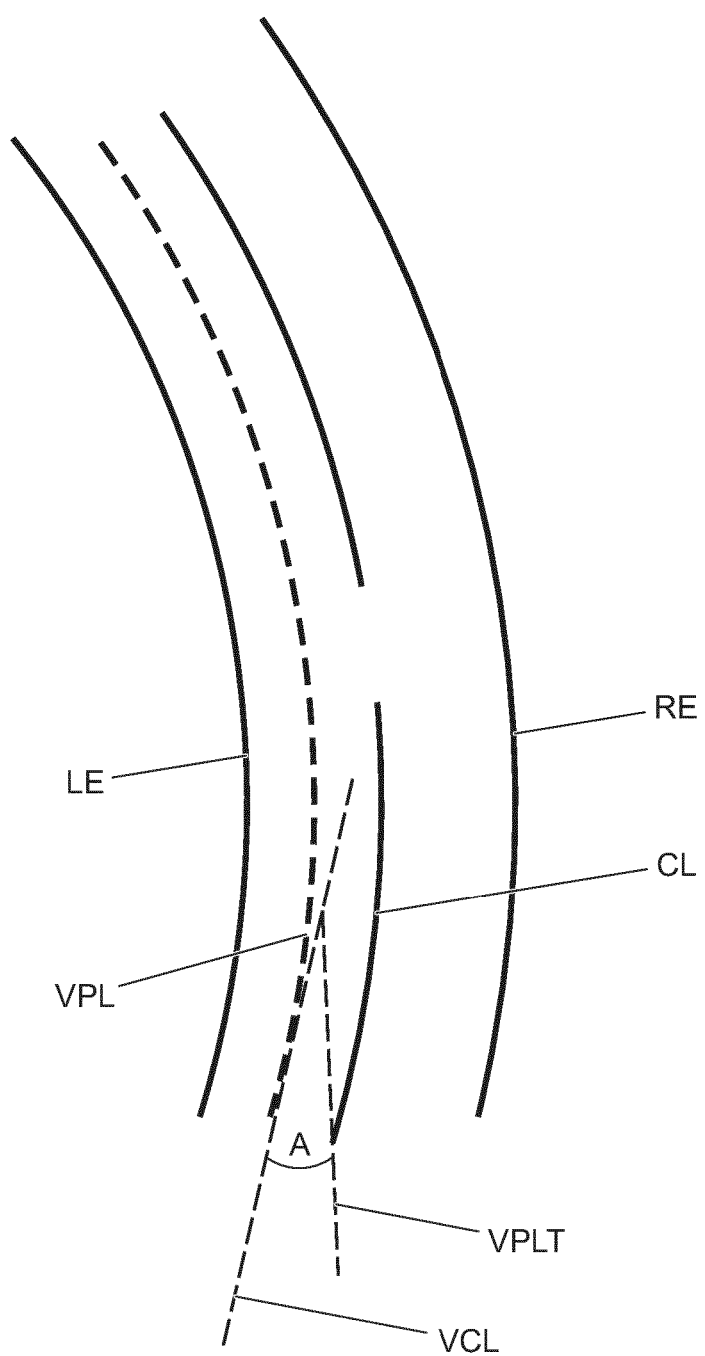
FIG. 8 is a flow chart illustrating operation of a vehicle according to the embodiment of FIG. 1.

Having obtained the coordinates of the path centreline CL, the processing portion determines a vehicle path line VPL, being the coordinates of a path that a centreline of the vehicle VCL (FIG. 1) is to follow. An example vehicle path line VPL is illustrated in FIG. 8, being shown superimposed on the image of FIG. 7(c), being a plan view of the predicted path in the (substantially horizontal) Xe-Ze plane as viewed along a vertical axis Ye in 'real world' coordinates and showing the left path edge LE, right path edge RE and path centreline CL following curve fitting. The vehicle path line VPL is determined by calculating the position of the vehicle centreline VCL relative to the closest path edge LE, RE and path centreline CL. In the present embodiment this is performed by extrapolating the path centreline CL and path edge LE, RE to the instant location of the vehicle 100. If the vehicle centreline VCL is substantially coincident with the path centreline CL, then the vehicle path line VPL is taken to be the path centreline CL. If the vehicle centreline VCL is to the left of the path centreline CL, the vehicle path line VPL is arranged to remain in substantially the same relative lateral position between the path centreline and closest path edge LE, RE.

In the example shown in FIG. 8, it is determined that at the instant location of the vehicle 100 the vehicle centreline VCL is substantially midway between the path centreline CL and left path edge LE. Accordingly the vehicle path line VPL is defined as a line substantially midway between the path centreline CL and left path edge LE in an extrapolation of the orthogonal projection of the path centreline CL and corresponding path edge LE, RE on a substantially horizontal plane as shown in FIG. 8.

The processing portion 19 then determines a VPL tangent angle A, being the angle between the vehicle centreline VCL and a line VPLT tangential to the vehicle path line VPL a predetermined tangent distance ahead of the instant location of the vehicle 100. In the present embodiment the predetermined tangent distance is substantially 6 m ahead of the vehicle 100 although other distances may be useful. Other values of predetermined distance may be useful.

Once the VPL tangent angle A has been determined, the processing portion outputs the VPL tangent angle A to the steering controller 170C. The steering controller 170C, in turn, sets the angle of the steerable road wheels to cause the vehicle to turn at an angle to the vehicle centreline VCL that is substantially equal to the VPL tangent angle A.

It is to be understood that, in the present embodiment, the steering controller 170C only causes the angle of the steerable road wheels to be set to an angle corresponding to the VPL tangent angle A (which may be an angle substantially equal to the VPL tangent angle A) if the LSP control system 12 is controlling vehicle speed and the driver has selected an automatic steering mode of operation by means of the LSP HMI 20.

Once an estimate of path curvature has been made, in the present embodiment the processing portion 19 also refers to data stored in a look-up table to determine the effect that the path curvature should have on vehicle speed. In the present embodiment, the processing portion determines a value of maximum recommended (or 'allowable') speed over the terrain ahead of the vehicle and outputs this speed to the LSP control system 12.

It is to be understood that the steering controller 170C, when adjusting steerable road wheel angle, also causes the steering wheel 171 to move to a rotational position corresponding to the steerable road wheel angle being set. That is, the correspondence between steering wheel angle and steerable road wheel angle is maintained substantially constantly by the steering controller 170C. Furthermore, the steering controller 170C continues to respond to driver adjustment of steering angle, and does not prevent a driver from adjusting the steering wheel angle to override the steering controller 170C when the automatic steering mode of operation is selected. Thus, if at any time the driver wishes to adjust the direction of travel of the vehicle 100 the driver is free to do so by adjusting the rotational position of the steering wheel 171, overriding automatic adjustment of steering angle by the steering controller 170C.

It is to be understood that knowledge by the processing portion 19 of steering input by a driver, for example steering angle or torque applied to the steering wheel 171 by a driver, may be employed by the processing portion 19 to increase confidence in the predicted path determined by the processing portion 19. For example, in the event that a fork exists in a path ahead of the vehicle 100 and therefore more than one possible path exists, the processing portion 19 may employ knowledge of any driver steering input to increase a confidence as to which fork will be taken, and therefore enable a most likely path to be determined. For example, if the steering controller 170C detects torque applied by the driver to the steering wheel 171 in an anticlockwise direction as the vehicle 100 approaches a fork, feedback of the detected torque to the processing portion 19 may cause the processing portion 19 to determine that the driver wishes to purse a path that forks to the left ahead of the vehicle 100, and vice versa.

In some embodiments, where a plurality of predicted path possibilities are determined to exist, the processing portion 19 may request that a driver input an indication as to which of the plurality of predicted paths is the desired one, for example by means of turn indicators, via the HMI 20, or by any other suitable means.

In the present embodiment the processing portion 19 also obtains an estimate of surface roughness of terrain ahead of the vehicle based on a combination of the 3D topographical information provided by the point cloud data and a current measured value of surface roughness generated by the VCU 10 based on sensor data. In some embodiments the processing portion may be able to classify the terrain in the path of the vehicle ahead of the vehicle as corresponding to terrain the vehicle 100 has previously driven over and access stored data in respect of that terrain in order to refine an estimate of terrain roughness. The VCU 10 may then take the predicted roughness value into account in addition to path curvature when determining the maximum recommended speed over the terrain ahead.

In some embodiments, in addition to the processing portion 19 outputting the value of maximum recommended speed to the LSP control system 12, the value of maximum recommended speed may also be displayed to a driver of the vehicle.

In the present embodiment, calculation of a maximum recommended speed value is only performed when the LSP control system 12 is switched on, regardless of whether the LSP control system 12 is active in controlling vehicle speed. In some embodiments, the VCU 10 may be configured such that the processing portion 19 calculates an estimate of maximum recommended speed taking road curvature into account and optionally surface roughness substantially continually whilst the vehicle 100 is being driven, for example whenever the vehicle 100 is in a predetermined condition such as a predetermined power mode or a gearbox of the vehicle is in a mode corresponding to a driving condition such as a forward driving condition, regardless of whether the LSP control system 12 is switched on.

Figure 9:
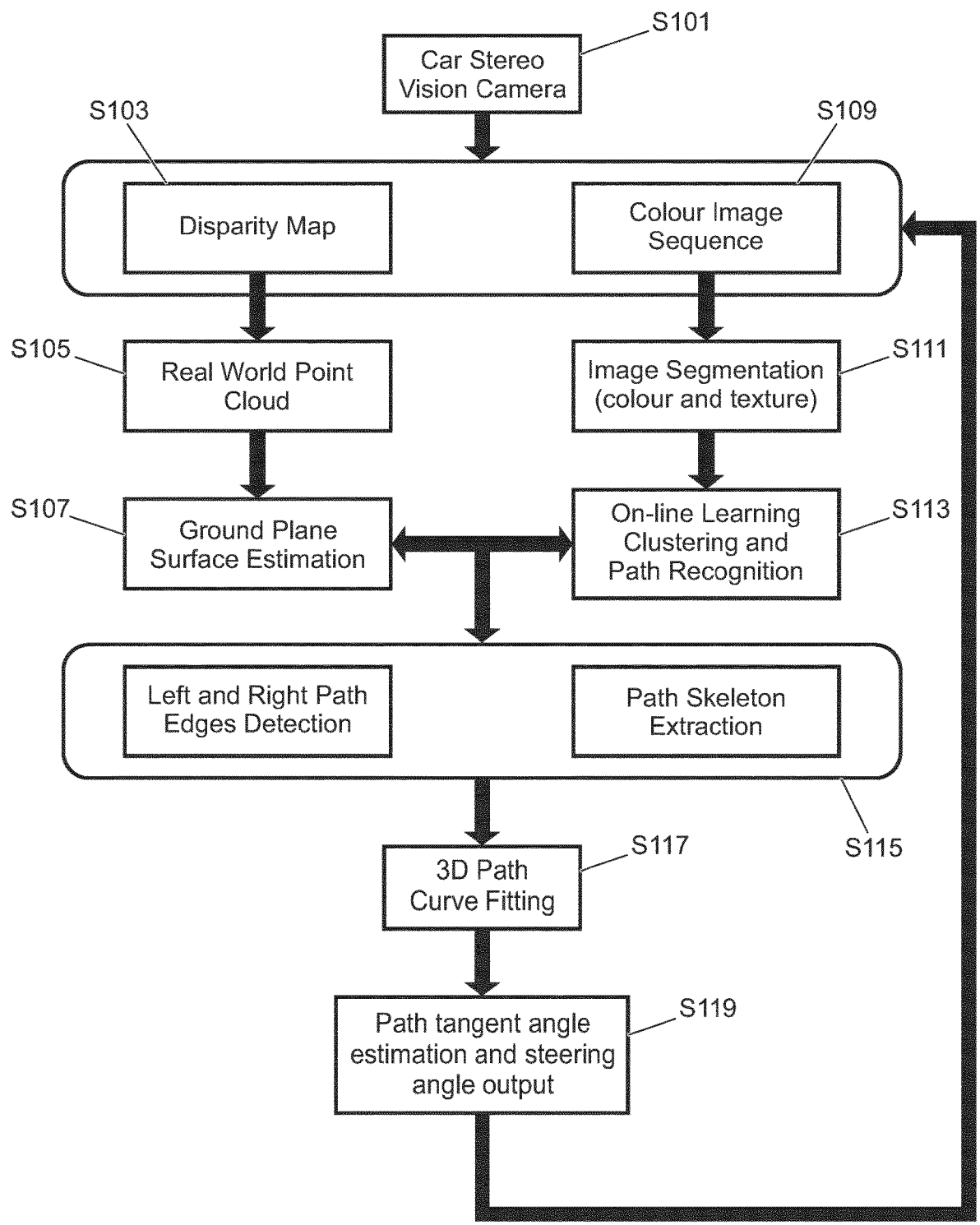
FIG. 9 shows a flowchart of the method of the invention.

FIG. 9 is a flow diagram illustrating a method according to an embodiment of the present invention.

At step S101 stereoscopic camera system 185C captures a pair of stereographic images of terrain ahead of the vehicle 100.

At step S103, processing portion 19 receives the pair of images and calculates a disparity map indicative of a difference (disparity) between the images. In some alternative embodiments, a controller associated with the stereoscopic camera system 185C, for example in the form of an embedded field programmable gate array (FPGA) processing card, calculates the disparity map and outputs the disparity map to the processing portion 19.

At step S105 the processing portion 19 calculates a real world 3D point cloud based on the disparity map, with respect to a frame of reference that is fixed with respect to earth (and not with respect to the vehicle 100). The processing portion 19 does this by reference at least in part to information in respect of vehicle orientation with respect to fixed earth coordinates provided by IMU 23.

In addition to steps S103 and S105, the processing portion also performs steps S109 and S111, prior to steps S107 and S113.

At step S109 the processing portion 19 applies a 2D image processing algorithm to one, e.g. the left, colour image of the stereoscope image pair received from the stereoscopic camera system 185C. At step S111 the processing portion 19 performs the Gaussian Mixture Models (GMM)-based image segmentation operation on the left colour image in respect of colour and texture as described above.

At step S113 the processing portion 19 applies an online learning scheme for off-road path detection and online learning clustering and path recognition described in more detail above.

At step S107 the processing portion 19 applies a 3D data processing algorithm and generates an estimation of a ground plane of the path detected at step S113, with respect to the 3D point cloud data generated at step S105.

At step S115 the processing portion 19 detects left and right edges of a predicted path, and a centreline CL of the predicted path (FIG. 7(b)), from the 2D data set generated at step S113. The path edges detected may be referred to as a 'skeleton' of the predicted path. The processing portion 10 then determines corresponding data points in the 3D point cloud data generated at step S105, which define a 3D path.

At step S117 the processing portion 19 performs a 3D path curve fitting operation to the centreline CL and left and right edges LE, RE of the predicted path with respect to the 3D point cloud data, thereby defining a centreline and left and right edges of the 3D predicted path. The processing portion 19 then calculates the vehicle path line VPL, which is a predicted path of the vehicle centreline VCL as described above. In the case that the vehicle 100 is located substantially coincident with the centreline CL of the 3D predicted path, the vehicle path line VPL is determined to be substantially coincident with the path centreline CL. In the case that the vehicle 100 is not located substantially coincident with the centreline CL of the 3D predicted path, the vehicle path line VPL is determined to be a path that is substantially parallel to the path centreline CL, and located between the path centreline CL and nearest path edge LE, RE, at a location that maintains a constant ratio of the distance of the vehicle centreline VCL from the path centreline CL and nearest path edge LE, RE substantially equal to that at the instant location of the vehicle 100.

At step S119 the processing portion 19 performs a curvature estimation operation in which the processing portion 19 estimates a curvature of the centreline of the vehicle path line VPL ahead of the vehicle 100, in the present embodiment the maximum curvature of the vehicle path line VPL detectable over a predetermined curvature distance ahead of the vehicle, in the present embodiment 25 m although other distances may be useful. The processing portion then refers to data stored in a look-up table correlating maximum curvature with maximum recommended ('allowable') speed over the terrain ahead of the vehicle. The processing portion 19 outputs this maximum speed to the LSP control system 12. The LSP control system 12 in turn controls the value of LSP_set-speed so that it does not exceed the value of maximum recommended speed.

In addition, in the present embodiment, the processing portion 19 calculates an estimate of a path tangent angle value A being the value of an angle to the instant vehicle centreline VCL of a tangent VPLT to the vehicle path line VPL at a predetermined distance ahead of the vehicle 100. In the present embodiment the predetermined distance is 6 m although other distances may be useful. The processing portion 19 then determines a required value of the instant steering angle of the vehicle 100 in dependence on the tangent angle value A and this value is output to steering controller 170C. As described above, in the present embodiment, the steering controller 170C is configured to set the angle of the steerable road wheels to an angle corresponding to the tangent angle value, such that the vehicle attempts to follow the vehicle path line. In the present embodiment the steering controller 170C is configured to set the angle of the steerable road wheels substantially to the tangent angle value A. Some embodiments of the present invention enable vehicle operation with enhanced composure when traversing terrain. This is at least in part due to a reduction in driver workload when operating with the LSP control system 12 active. This is because a driver is not required manually to steer the vehicle in order to progress along terrain. Furthermore, in the present embodiment the driver is also not required to increase or decrease the value of user_set-speed in response to changes in path curvature ahead of the vehicle 100. Rather, the vehicle 100 anticipates the curvature of the path ahead of the vehicle 100 and adjusts vehicle speed accordingly.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An off-road control system for a vehicle, the system comprising a processing means configured to:
    receive, from terrain data capture means configured to capture data in respect of terrain ahead of the vehicle by means of one or more sensors, terrain information indicative of the topography of an area extending ahead of the vehicle, wherein the terrain information comprises data defining at least one two-dimensional (2D) image of the terrain ahead of the vehicle;
    perform a segmentation operation on image data defining said at least one 2D image and, based on the segmentation, identify in the image data either or both edges and a centreline of a predicted path of the vehicle;
    calculate three-dimensional (3D) data in respect of the terrain ahead of the vehicle based on the terrain information;
    determine the 3D coordinates of either or both of lateral edges and the centreline of the predicted path of the vehicle by reference to the 3D data based on the coordinates of either or both the edges and centreline of the predicted path identified in the 2D image to determine a 3D predicted path of the vehicle;
    perform a curve fitting operation by fitting a 3D curve to 3D data points defining the lateral edges and centreline of the predicted path by fitting respective 2D curves to a projection of data points defining the lateral edges and centreline of the predicted path onto the Xe-Ze plane before calculating corresponding values of curvature, wherein the processing means is configured to perform the curve fitting operation by using a third order polynomial model with a constraint of a substantially constant road width and a condition that a road centreline must pass through the origin of the coordinate system;
    recognize portions of the 3D predicted path that include one or more obstacles that are unlikely to be traversed by the vehicle based on at least one selected from the following: at least one obstacle representing a step change in height exceeding a predetermined amount; at least one obstacle presenting a gradient exceeding a predetermined amount; and at least one obstacle having a combination of height and lateral extent not meeting at least one predetermined criteria;
    refine the 3D predicted path of the vehicle based on a presence of at least one of the one or more obstacles; and
    control the direction of travel of the vehicle based at least in part on the refined 3D predicted path.

2. The system according to claim 1, wherein the 3D data is a point cloud dataset.

3. The system according to claim 1, wherein the processing means is further configured to determine a centreline of the predicted path defined by the lateral edges thereof and a lateral location of the vehicle with respect to the predicted path centreline, the system being configured to control the direction of travel of the vehicle based on the predicted path centreline and lateral vehicle location relative to the predicted path centreline.

4. The system according to claim 1, wherein the processing means is further configured to control the direction of travel of the vehicle to maintain the vehicle within the lateral edges of the predicted path.

5. The system according to claim 3, wherein the processing means is further configured to control the direction of travel of the vehicle to maintain a substantially constant lateral distance of the vehicle centreline from either or both the predicted path centreline and the lateral edge of the predicted path.

6. The system according to claim 1, wherein the processing means is further configured to generate a vehicle path line that is substantially coincident with or parallel to the predicted path centreline, the system being configured to set a steering angle of the vehicle to an angle corresponding to the angle of a tangent to the vehicle path line at a predetermined tangent location along the vehicle path line.

7. The system according to claim 1, wherein the data defining at least one 2D image of the terrain ahead of the vehicle comprises terrain colour information, and the processing means is further configured to, prior to performing the segmentation operation, generate a colour and texture descriptor comprising colour information and texture information in respect of each pixel of the image, with the exception of the pixels defining the border of each image.

8. The system according to claim 7, wherein the texture information for the colour and texture descriptor is generated by subtracting the intensity of a given pixel from the intensity of each of the 8 pixels surrounding that pixel, to give eight texture descriptors per pixel.

9. The system according to claim 1, wherein the processing means being configured to perform the segmentation operation on image data defining said at least one 2D image and identify in the image data edges of the predicted path of the vehicle comprises the processing means being configured to either receive from a user or determine automatically an indication of a location in the image of at least one path region being a region of the image that is considered to be part of a traversable path of the vehicle, the processing means being configured to employ image data in respect of the at least one path region in determining edges of the predicted path.

10. The system according to claim 1, wherein the processing means is further configured to either receive from a user or determine automatically an indication of a location in the image of at least one non-path region being a region of the image that is considered to not be part of a traversable path of the vehicle, the processing means being configured to employ image data in respect of at least one non-path region in determining edges of the predicted path.

11. The system according to 1, wherein the processing means is further configured to calculate a curvature of the 3D predicted path.

12. The system according to claim 11, further comprising a speed controller configured to control vehicle speed based at least in part on the curvature of the 3D predicted path.

13. The system according to claim 1, wherein the processing means is further configured to generate a first estimate of surface roughness of terrain ahead of the vehicle based at least in part on terrain information indicative of the topography of the area extending ahead of the vehicle.

14. The system according to claim 1, wherein the terrain data capture means comprises a stereoscopic camera system.

15. The system according to claim 1, wherein the system comprises:
an electronic processor having an electrical input for receiving the terrain information indicative of the topography of terrain ahead of the vehicle; and
an electronic memory device electrically coupled to the electronic processor and having instructions stored therein, wherein the electronic processor is configured to access the memory device and execute the instructions stored therein such that it is operable to:
perform a segmentation operation on image data defining said at least one 2D image and identify in the image data edges of the predicted path of the vehicle;
calculate a 3D point cloud dataset in respect of the terrain ahead of the vehicle based on the terrain information;
determine the 3D coordinates of edges of the predicted path of the vehicle by reference to the point cloud dataset, based on the coordinates of edges of the predicted path identified in the 2D image, to determine a 3D predicted path of the vehicle; and
cause the direction of travel of the vehicle to be controlled based at least in part on the 3D predicted path.

16. A vehicle comprising the system according to claim 1.

17. An off-road system for a vehicle, the system comprising a processing means configured to:
receive, from terrain data capture means configured to capture data in respect of terrain ahead of the vehicle by means of one or more sensors, terrain information indicative of the topography of an area extending ahead of the vehicle, wherein the terrain information comprises data defining at least one two-dimensional (2D) image of the terrain ahead of the vehicle;
perform a segmentation operation on image data defining said at least one 2D image and, based on the segmentation, identify in the image data either or both edges and a centreline of a predicted path of the vehicle;
calculate three-dimensional (3D) data in respect of the terrain ahead of the vehicle based on the terrain information;
determine the 3D coordinates of either or both edges and the centreline of the predicted path of the vehicle by reference to the 3D data based on the coordinates of either or both the edges and the centreline of the predicted path identified in the 2D image to determine a 3D predicted path of the vehicle;
perform a curve fitting operation by fitting a 3D curve to 3D data points defining the lateral edges and centreline of the predicted path by fitting respective 2D curves to a projection of data points defining the lateral edges and centreline of the predicted path onto the Xe-Ze plane before calculating corresponding values of curvature, wherein the processing means is configured to perform the curve fitting operation by using a third order polynomial model with a constraint of a substantially constant road width and a condition that a road centreline must pass through the origin of the coordinate system;
recognize portions of the 3D predicted path that include one or more obstacles that are unlikely to be traversed by the vehicle based on at least one selected from the following: at least one obstacle representing a step change in height exceeding a predetermined amount; at least one obstacle presenting a gradient exceeding a predetermined amount; and at least one obstacle having a combination of height and lateral extent not meeting at least one predetermined criteria;

refine the 3D predicted path of the vehicle based on a presence of at least one of the one or more obstacles; and output a signal based at least in part on the refined 3D predicted path.

18. A method of predicting the path of a vehicle, the method comprising:

receiving, from terrain data capture means configured to capture data in respect of terrain ahead of the vehicle by means of one or more sensors, terrain information indicative of the topography of an area extending ahead of the vehicle, the terrain information comprising data defining at least one two-dimensional (2D) image of the terrain ahead of the vehicle;

performing a segmentation operation on image data defining said at least one 2D image and, based on the segmentation, identifying in the image data either or both edges and a centreline of a predicted path of the vehicle;

calculating three-dimensional (3D) data in respect of the terrain ahead of the vehicle based on the terrain information;

determining the 3D coordinates of either or both the edges and the centreline of the predicted path of the vehicle by reference to the 3D data based on the coordinates of either or both the edges and the centreline of the predicted path identified in the 2D image to determine a 3D predicted path of the vehicle;

performing a curve fitting operation by fitting a 3D curve to 3D data points defining the lateral edges and centreline of the predicted path by fitting respective 2D curves to a projection of data points defining the lateral edges and centreline of the predicted path onto the Xe-Ze plane before calculating corresponding values of curvature, wherein performing the curve fitting operation includes using a third order polynomial model with a constraint of a substantially constant road width and a condition that a road centreline must pass through the origin of the coordinate system;

recognizing portions of the 3D predicted path that include one or more obstacles that are unlikely to be traversed by the vehicle based on at least one selected from the following: at least one obstacle representing a step change in height exceeding a predetermined amount; at least one obstacle presenting a gradient exceeding a predetermined amount; and at least one obstacle having a combination of height and lateral extent not meeting at least one predetermined criteria;

refining the 3D predicted path of the vehicle based on a presence of at least one of the one or more obstacles; and controlling the direction of travel of the vehicle based at least in part on the refined 3D predicted path.

19. A method of predicting the path of a vehicle, the method comprising:

receiving, from terrain data capture means configured to capture data in respect of terrain ahead of the vehicle by means of one or more sensors, terrain information indicative of the topography of an area extending ahead of the vehicle, the terrain information comprising data defining at least one two-dimensional (2D) image of the terrain ahead of the vehicle;

performing a segmentation operation on image data defining said at least one 2D image and, based on the segmentation, identifying in the image data either or both edges and a centreline of a predicted path of the vehicle;

calculating three-dimensional (3D) data in respect of the terrain ahead of the vehicle based on the terrain information;

determining the 3D coordinates of either or both the edges and the centreline of the predicted path of the vehicle by reference to the 3D data based on the coordinates of either or both the edges and the centreline of the predicted path identified in the 2D image to determine a 3D predicted path of the vehicle;

performing a curve fitting operation by fitting a 3D curve to 3D data points defining the lateral edges and centreline of the predicted path by fitting respective 2D curves to a projection of data points defining the lateral edges and centreline of the predicted path onto the Xe-Ze plane before calculating corresponding values of curvature, wherein performing the curve fitting operation includes using a third order polynomial model with a constraint of a substantially constant road width and a condition that a road centreline must pass through the origin of the coordinate system;

recognizing portions of the 3D predicted path that include one or more obstacles that are unlikely to be traversed by the vehicle based on at least one selected from the following: at least one obstacle representing a step change in height exceeding a predetermined amount; at least one obstacle presenting a gradient exceeding a predetermined amount; and at least one obstacle having a combination of height and lateral extent not meeting at least one predetermined criteria;

refining the 3D predicted path of the vehicle based on a presence of at least one of the one or more obstacles; and outputting a signal based at least in part on the refined 3D predicted path.

20. A non-transitory computer program product executable on a processor so as to implement the method of claim 18.

* * * * *